US012670408B2

(12) United States Patent (10) Patent No.: US 12,670,408 B2

Tai et al. (45) Date of Patent: Jun. 30, 2026

(54) TRAINING APPARATUS, CLASSIFICATION APPARATUS, TRAINING METHOD, CLASSIFICATION METHOD, AND PROGRAM

(71) Applicant: NEC Corporation, Tokyo (JP)

(72) Inventors: Tsenjung Tai, Tokyo (JP); Masato Toda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 560 days.

(21) Appl. No.: 18/270,812

(22) PCT Filed: Dec. 3, 2021

(86) PCT No.: PCT/JP2021/044388

§ 371 (c)(1),
(2) Date: Jul. 3, 2023

(87) PCT Pub. No.: WO2022/153710

PCT Pub. Date: Jul. 21, 2022

(65) Prior Publication Data

US 2024/0054349 A1 Feb. 15, 2024

(30) Foreign Application Priority Data

Jan. 12, 2021 (JP) ................................ 2021-003115

(51) Int. Cl.
 *G06N 3/09* (2023.01)
(52) U.S. Cl.
 CPC ..................................... *G06N 3/09* (2023.01)
(58) Field of Classification Search
 CPC ..................................................... G06N 3/09

(Continued)

(56) References Cited

U.S. PATENT DOCUMENTS

| 11,947,625 | B2 * | 4/2024 | Mummadi | ............ | G06F 18/214 |
| 2011/0071965 | A1 * | 3/2011 | Long | ...................... | G06N 20/00 |
| | | | | | 706/54 |

(Continued)

FOREIGN PATENT DOCUMENTS

| JP | 2016-058079 A | 4/2016 |
| JP | 2019-139651 A | 8/2019 |

(Continued)

OTHER PUBLICATIONS

International Search Report for PCT Application No. PCT/JP2021/044388, mailed on Mar. 8, 2022.

(Continued)

*Primary Examiner* — Leron Beck
(74) *Attorney, Agent, or Firm* — Sughrue Mion, PLLC

(57) ABSTRACT

To provide an efficient and stable training process even in a case where a small amount of target domain labeled data is available.
Solution to Problem
A training apparatus (1) comprises: feature extraction means (11) for extracting source domain feature values from source domain data and for extracting target domain feature values from target domain data; prediction means (12) for predicting source domain class prediction values from the source domain feature values and for predicting target domain class prediction values from the target domain feature values; filtering means (13) for computing filtered source domain feature values and filtered target domain feature values by filtering out one or more values from the source domain feature values with reference to the source domain class prediction values and by filtering out one or more values from the target domain feature values with reference to the target domain class prediction values; and updating means (Continued)

(14) for updating at least one of the feature extraction means and the class prediction means.

13 Claims, 14 Drawing Sheets

(58) Field of Classification Search
USPC .......................................................... 706/20
See application file for complete search history.

(56) References Cited

U.S. PATENT DOCUMENTS

| | | | | |
|---|---|---|---|---|
| 2012/0185415 A1* | 7/2012 | Chenthamarakshan | ...................... | G06F 16/355 706/12 |
| 2016/0070986 A1 | 3/2016 | Chidlovskii et al. | | |
| 2016/0078359 A1* | 3/2016 | Csurka | ................. | G06V 10/776 706/12 |
| 2016/0253597 A1* | 9/2016 | Bhatt | ...................... | G06N 20/00 706/12 |
| 2017/0140253 A1* | 5/2017 | Wshah | ...................... | G06N 3/08 |
| 2017/0220951 A1* | 8/2017 | Chidlovskii | ........... | G06N 20/00 |
| 2018/0174071 A1* | 6/2018 | Bhatt | ........................ | G06N 3/08 |
| 2018/0218284 A1* | 8/2018 | Jawahar | ................... | G06N 3/08 |
| 2018/0240243 A1* | 8/2018 | Kim | ........................ | G06T 7/162 |
| 2019/0147335 A1* | 5/2019 | Wang | ................... | G06N 3/0464 706/20 |
| 2020/0111194 A1* | 4/2020 | Wang | ................... | G06T 3/4076 |
| 2020/0118423 A1* | 4/2020 | Moura | ................ | G08G 1/0129 |
| 2020/0130177 A1* | 4/2020 | Kolouri | ................ | G06N 3/0464 |
| 2020/0210824 A1* | 7/2020 | Poornaki | ................ | G06N 3/082 |
| 2020/0250514 A1 | 8/2020 | Kim et al. | | |
| 2021/0012198 A1* | 1/2021 | Zhang | ................... | G06N 3/084 |
| 2021/0012486 A1* | 1/2021 | Huang | ................... | G06N 3/045 |
| 2021/0056693 A1 | 2/2021 | Cheng et al. | | |
| 2021/0064912 A1 | 3/2021 | Ono | | |
| 2021/0158166 A1* | 5/2021 | Azarian Yazdi | ....... | G06N 3/048 |
| 2021/0201152 A1* | 7/2021 | Santillán Perez | ........ | G06N 3/09 |
| 2022/0108134 A1* | 4/2022 | Marrero | .............. | G06F 18/2148 |

FOREIGN PATENT DOCUMENTS

| | | | |
|---|---|---|---|
| JP | 2020-061761 | A | 4/2020 |
| JP | 2020-126623 | A | 8/2020 |
| JP | WO2019/146057 | A1 | 10/2020 |
| WO | 2020/094026 | A1 | 5/2020 |
| WO | 2020/235033 | A1 | 11/2020 |

OTHER PUBLICATIONS

English translation of Written opinion for PCT Application No. PCT/JP2021/044388, mailed on Mar. 8, 2022.
Xiang Xu et al., "d-SNE: Domain Adaptation using Stochastic Neighborhood Embedding", 2019 IEEE/CVP Conference on Computer Vision and Pattern Recognition (CVPR 2019).
JP Office Action for JP Application No. 2023-541364, mailed on Aug. 27, 2024 with English Translation.
Extended European Search Report for EP Application No. 21919599.7, dated on May 29, 2024.
Taotao Jing et al., "Adaptively-Accumulated Knowledge Transfer for partial Domain Adaptation", MM '20: Proceedings of the 28th ACM International Conference on Multimedia, Oct. 12, 2020, pp. 1606-1614, XP058730419, <DOI: 10.1145/3394171.3413986>.
Mengmeng Jing et al., "Learning Distribution-Matched Landmarks for Unsupervised Domain Adaptation", May 12, 2018, Lecture Notes in Computer Science, pp. 491-508, XP047480454.
Mei Wang et al., "Deep Visual Domain Adaptation: A Survey", arXiv, May 25, 2018, XP055762597, Retrieved from the Internet: URL: <https://arxiv.org/pdf/1802.03601.pdf> [retrieved on Jan. 4, 2021].

* cited by examiner

Example of Input Data
$I^S$
(Source Domain)

Example of Input Data
$I^T$
(Target Domain)

Figure 13:
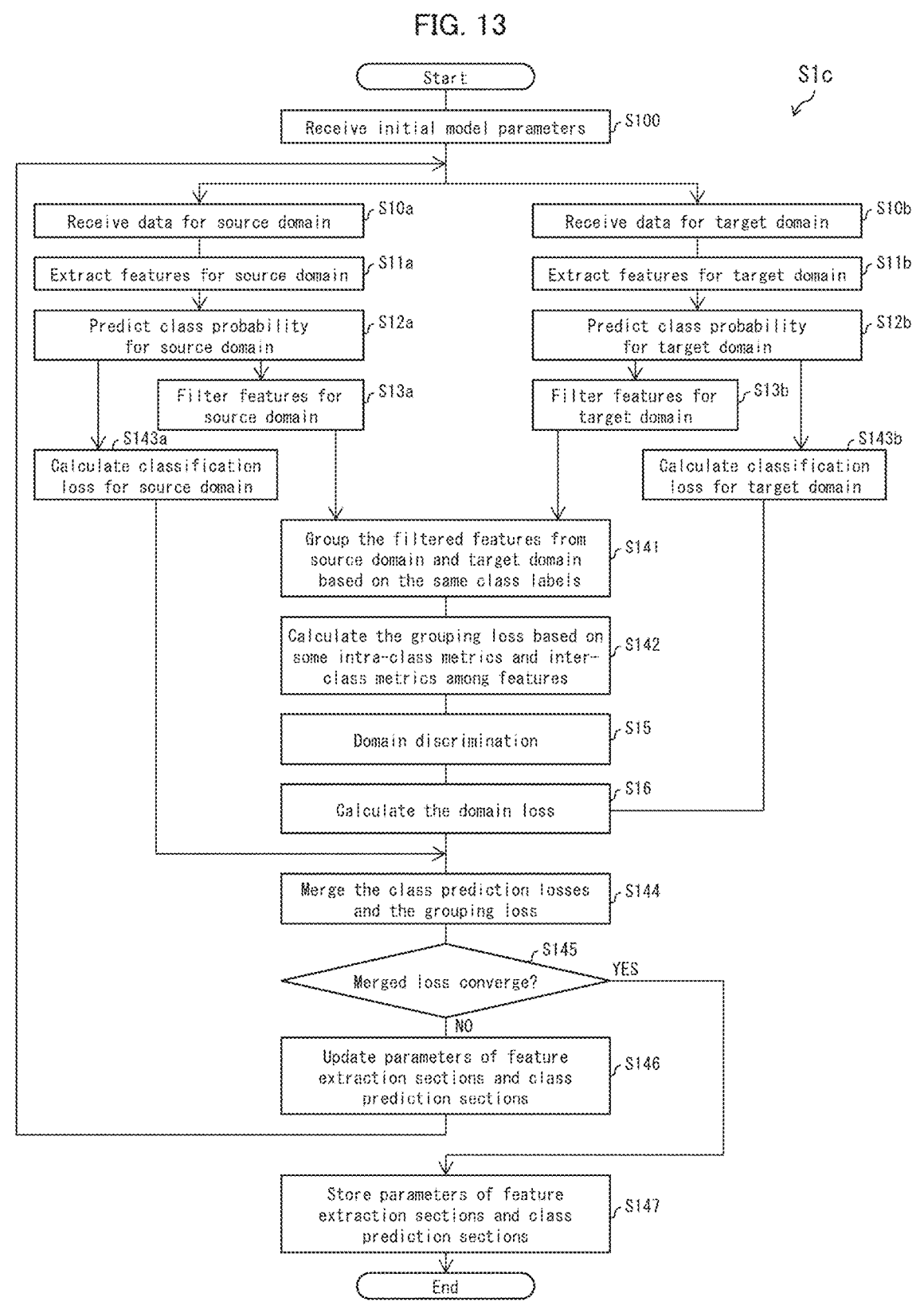

Start

Receive initial model parameters — S100

Receive data for source domain — S10a
Receive data for target domain — S10b

Extract features for source domain — S11a
Extract features for target domain — S11b Predict class probability for source domain — S12a
Predict class probability for target domain — S12b Filter features for source domain — S13a
Filter features for target domain — S13b Calculate classification loss for source domain — S143a
Calculate classification loss for target domain — S143b Group the filtered features from source domain and target domain based on the same class labels — S141

Calculate the grouping loss based on some intra-class metrics and inter-class metrics among features — S142

Domain discrimination — S15

Calculate the domain loss — S16

Merge the class prediction losses and the grouping loss — S144

Merged loss converge? — S145    YES

NO

Update parameters of feature extraction sections and class prediction sections — S146

Store parameters of feature extraction sections and class prediction sections — S147

End

FIG. 15

TRAINING APPARATUS, CLASSIFICATION APPARATUS, TRAINING METHOD, CLASSIFICATION METHOD, AND PROGRAM

This application is a National Stage Entry of PCT/JP2021/044388 filed on Dec. 3, 2021, which claims priority from Japanese Patent Application 2021-003115 filed on Jan. 12, 2021, the contents of all of which are incorporated herein by reference, in their entirety.

TECHNICAL FIELD

The present application relates to a training apparatus, a classification apparatus, a training method, a classification method, and a program.

BACKGROUND ART

Machine learning techniques such as neural networks often require a large amount of labeled data in order to train their parameters. On the other hand, it sometimes happens that only a small amount of labeled data is available.

So-called domain adaptation techniques have been proposed which may be applicable in such a situation (for example, see Non-patent Literature 1). The domain adaptation techniques exploit a large amount of alternative representative data set (often referred to as source domain data set) besides target data set (often referred to as target domain data set).

CITATION LIST

Non Patent Literature

NPL 1: Xiang Xu et. al., "d-SNE: Domain Adaptation using Stochastic Neighborhood Embedding", Proceedings of the IEEE conference on computer vision and pattern recognition. 2019

SUMMARY OF INVENTION

Technical Problem

The domain adaptation technique disclosed in Non-patent Literature 1 has a problem that a training process becomes unstable due to influence of outliers, and thus the training process cannot be efficiently carried out.

An example aspect of the present invention is attained in view of the problem, and an example object is to provide an efficient and stable training process even in a case where a small amount of target domain labeled data is available.

SOLUTION TO PROBLEM

Solution to Problem

In order to attain the object described above, a training apparatus comprising at least one processor, the processor carrying out: extraction process for extracting, by one or more feature extractors, source domain feature values from source domain data and for extracting target domain feature values from target domain data; prediction process for predicting, by one or more class predictors, source domain class prediction values from the source domain feature values and for predicting target domain class prediction values from the target domain feature values; filtering process for computing filtered source domain feature values and filtered target domain feature values by filtering out one or more values from the source domain feature values with reference to the source domain class prediction values and by filtering out one or more values from the target domain feature values with reference to the target domain class prediction values; and updating process for updating at least one of the one or more feature extractors and one or more class predictors with reference to a source domain classification loss computed with reference to the source domain class prediction values, a target domain classification loss computed with reference to the target domain class prediction values, and a grouping loss computed with reference to the filtered source domain feature values and the filtered target domain feature values.

In order to attain the object described above, a classification apparatus comprising at least one processor, the processor carrying out: extraction process for extracting, by a feature extractor, target domain feature values from target domain data; and prediction process for predicting, by a class predictor, target domain class prediction values from the target domain feature values, wherein at least one of the feature extractor and the class predictor has been trained with reference to filtered source domain feature values obtained by filtering out one or more values from source domain feature values, and filtered target domain feature values obtained by filtering out one or more values from target domain feature values.

In order to attain the object described above, a training method comprising: extracting, by one or more feature extractors, source domain feature values from source domain data and target domain feature values from target domain data; predicting, by one or more class predictors, source domain class prediction values from the source domain feature values and target domain class prediction values from the target domain feature values; computing filtered source domain feature values and filtered target domain feature values by filtering out one or more values from the source domain feature values with reference to the source domain class prediction values and by filtering out one or more values from the target domain feature values with reference to the target domain class prediction values; and updating at least one of the one or more feature extractors and the one or more class predictors with reference to a source domain classification loss computed with reference to the source domain class prediction values, a target domain classification loss computed with reference to the target domain class prediction values, and a grouping loss computed with reference to the filtered source domain feature values and the filtered target domain feature values.

In order to attain the object described above, a non-transitory storage medium storing therein a program for causing a computer to serve as the training apparatus, said program causing the computer to carry out the extraction process, the prediction process, the filtering process, and the updating process.

In order to attain the object described above, a non-transitory storage medium storing therein a program for causing a computer to serve as the classification apparatus, said program causing the computer to carry out the extraction process and the prediction process.

ADVANTAGEOUS EFFECTS OF INVENTION

Advantageous Effects of Invention

According to an example aspect of the present invention, it is possible to provide an efficient and stable training process even in a case where a small amount of target domain labeled data is available.

BRIEF DESCRIPTION OF DRAWINGS

FIG. 13 is a flowchart showing a flow of a training method according to the fourth example embodiment.

FIG. 15 is a block diagram illustrating a hardware configuration according to the example embodiments.

DESCRIPTION OF EMBODIMENTS

First Example Embodiment

The following description will discuss details of a first example embodiment according to the invention with reference to the drawings. The first example embodiment is an example embodiment which serves as the basis of the subsequent example embodiments.

Overview of First Example Embodiment

The training apparatus according to the first example embodiment trains a feature extraction section which extracts feature values from data that is inputted to the training apparatus. The training apparatus also trains a class prediction section which carries out classification based on the feature values.

A classification apparatus according to the first example embodiment includes the feature extraction section and the class prediction section which have been thus trained.

In the first example embodiment, data that belongs to a source domain and data that belongs to a target domain are used. Here, the term "domain" is used merely to conceptually discriminate between data sets, and does not limit the first example embodiment.

In the first example embodiment, the data belonging to the source domain is greater in data size than the data belonging to the target domain. Moreover, the data belonging to the source domain contains more labeled data, as compared with the data belonging to the target domain. Here, the term "labeled data" refers to data that is labeled with "ground truth". The labeled data can be used by the training apparatus for supervised learning or for semi-supervised learning.

The classification apparatus according to the first example embodiment is aimed at carrying out classification with respect to the data belonging to the target domain. In order to improve precision of the classification with respect to the data belonging to the target domain, the training apparatus according to the first example embodiment carries out a training process using not only the data belonging to the target domain but also the data belonging to the source domain.

In the classification apparatus which carries out the process as described above, knowledge obtained from the source domain is to be used also for training in the target domain. Therefore, the classification apparatus according to the first example embodiment can be expressed as a classification apparatus which carries out so-called domain adaptation.

Types of data which are inputted to the training apparatus and to the classification apparatus do not limit the first example embodiment. Note, however, that data belonging to the source domain and data belonging to the target domain preferably belong to the same category.

For example, the data belonging to the source domain and the data belonging to the target domain which are inputted to the training apparatus and to the classification apparatus can be image data, sensing data obtained by various sensors, linguistic data which has been converted into a numerical form, or other types of data.

Configuration of Training Apparatus

Figure 1:
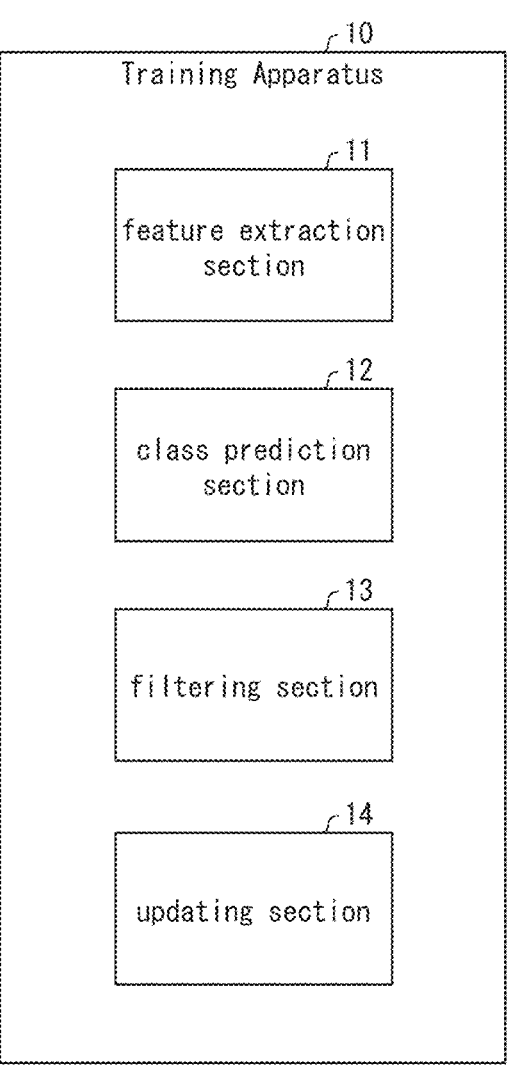
FIG. 1 is a block diagram illustrating a configuration of the training apparatus according to the first example embodiment.

The following description will discuss a configuration of a training apparatus 10 according to the first example embodiment with reference to FIG. 1. FIG. 1 is a block diagram illustrating a configuration of the training apparatus 10. As illustrated in FIG. 1, the training apparatus 10 includes a feature extraction section 11, a class prediction section 12, a filtering section 13, and an updating section 14. In the first example embodiment, the number of each of the feature extraction section 11, the class prediction section 12, and the filtering section 13 can be one or can be two or more.

The feature extraction section 11 is an example of feature extraction means recited in claims. The class prediction section 12 is an example of class prediction means recited in claims. The filtering section 13 is an example of filtering means recited in claims. The updating section 14 is an example of updating means recited in claims.

To the feature extraction section 11, source domain data and target domain data are inputted. Here, the source domain data is data belonging to the source domain, and the target domain data is data belonging to the target domain.

The feature extraction section 11 extracts source domain feature values from the source domain data. Moreover, the feature extraction section 11 extracts target domain feature values from the target domain data.

Here, in a case where the number of the feature extraction section 11 is one, it is preferable to employ a configuration in which a domain label for discriminating between the source domain data and the target domain data is inputted to the feature extraction section 11 so that the feature extraction section 11 can discriminate between the source domain data and the target domain data based on the domain label.

Note that a specific configuration of the feature extraction section 11 does not limit the first example embodiment. For example, the feature extraction section 11 can be a convolutional neural network (CNN), can be a recurrent neural network (RNN), or can be any of other neural networks or feature extractors. Furthermore, the feature extraction section 11 can be any of non-learning based techniques. For example, the feature extraction section 11 can be realized as SIFT (Scale-Invariant Feature Transform), a non-learning-based feature extraction method in which each feature value is a keypoint in the image (x,y-coordinates), and a feature value for each image is a set of keypoints. Furthermore, the feature extraction section 11 can be realized as a manually selected/designed feature extraction method (rule-based).

The class prediction section 12 predicts source domain class prediction values from the source domain feature values extracted by the feature extraction section 11, and outputs the source domain class prediction values. Moreover, the class prediction section 12 predicts target domain class prediction values from the target domain feature values extracted by the feature extraction section 11, and outputs the target domain class prediction values.

Here, a specific configuration of the class prediction section 12 does not limit the first example embodiment. For example, the class prediction section 12 can be configured to (i) output source domain class prediction values by comparing the source domain feature values with a certain threshold and (ii) output target domain class prediction values by comparing the target domain feature values with another threshold.

The filtering section 13 computes filtered source domain feature values by filtering out one or more values from the source domain feature values with reference to the source domain class prediction values. Moreover, the filtering section 13 computes filtered target feature values by filtering out one or more values from the target domain feature values with reference to the target domain class prediction values.

Although filtering conditions adopted by the filtering section 13 do not limit the first example embodiment, it is possible to employ the following exemplary configuration.

The filtering section 13 may receive source domain class label data. Here, the source domain class label data indicates a ground truth label associated with the source domain data received by the feature extraction section 11. Then, the filtering section 13 may filter out one or more values from the source domain feature values with reference to the source domain class prediction values and to source domain class label data. More specifically, the filtering section 13 may filter out, from the source domain feature values, one or more values which are not consistent with the source domain class label data.

Moreover, the filtering section 13 may receive target domain class label data. Here, the target domain class label data indicates ground truth labels associated with the target domain data received by the feature extraction section 11. Then, the filtering section 13 may filter out one or more values from the target domain feature values with reference to the target domain class prediction values and to target domain class label data. More specifically, the filtering section 13 may filter out, from the target domain feature values, one or more values which are not consistent with the target domain class label data.

The updating section 14 updates at least one of the feature extraction section 11 and the class prediction section 12 with reference to a source domain classification loss, a target domain classification loss, and a grouping loss. For example, the updating section 14 updates parameters with reference to the source domain classification loss, the target domain classification loss, and the grouping loss, and provides the feature extraction section 11 and the class prediction section 12 with the updated parameters.

The source domain classification loss may be computed with reference to the source domain class prediction values. For example, the source domain classification loss may be computed with reference to the source domain class prediction values and the source domain class label data.

The target domain classification loss may be computed with reference to the target domain class prediction values. For example, the target domain classification loss may be computed with reference to the target domain class prediction values and the target domain class label data.

The grouping loss may be computed with reference to the filtered source domain feature values and the filtered target domain feature values.

Although a computation algorism for computing the grouping loss does not limit the first example embodiment, it is possible to employ the following exemplary configuration.

The grouping loss may be computed based on intra class metrics determined with reference to the filtered feature values in a same class, and on inter class metrics determined with reference to the filtered feature values in different classes.

Advantageous Effect

According to the first example embodiment, as mentioned above, the updating section 14 updates at least one of the feature extraction section 11 and the class prediction section 12 with reference to the grouping loss in addition to the source domain classification loss and the target domain classification loss. Therefore, according to the first example embodiment, the feature extraction section 11 and the class prediction section 12 can be appropriately trained even in a case where a small amount of target domain labeled data is available.

Furthermore, according to the first example embodiment, as mentioned above, the filtering section 13 computes the filtered source domain feature values and the filtered target domain feature values, and the updating section 14 updates at least one of the feature extraction section 11 and the class prediction section 12 with reference to the grouping loss in addition to the source domain classification loss and the target domain classification loss. Here, as explained above, the grouping loss is obtained with reference to the filtered source domain feature values and the filtered target domain feature values.

Therefore, according to the first example embodiment, outliers which may be included in the source domain feature values and the target domain feature values can be filtered out by the filtering section 13, and do not destabilize a training process of the feature extraction section 11.

Therefore, the training apparatus 10 according to the first example embodiment provides an efficient and stable training process even in a case where a small amount of target domain labeled data is available.

Training Method by Training Apparatus

Figure 2:
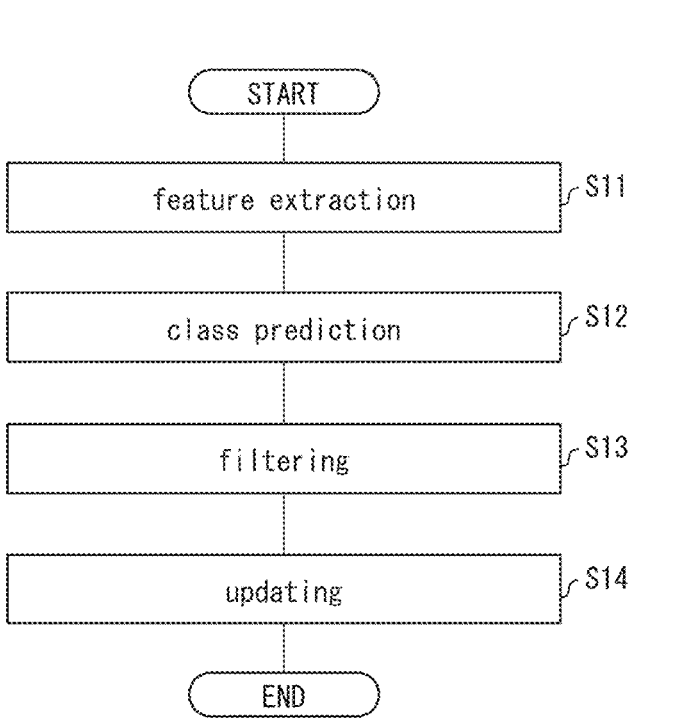
FIG. 2 is a flowchart showing a flow of a training method according to the first example embodiment.

The following description will discuss a training method carried out by the training apparatus 10 according to the first example embodiment with reference to FIG. 2. FIG. 2 is a flowchart showing a flow of a training method Si carried out by the training apparatus 10. As shown in FIG. 2, the training apparatus 10 carries out a feature extraction step S11, a class prediction step S12, a filtering step S13, and an updating step S14.

Feature Extraction Step S11

In the feature extraction step S11, the feature extraction section 11 extracts source domain feature values from source domain data and extracts target domain feature values from target domain data.

Class Prediction Step S12

In the class prediction step S12, the class prediction section 12 predicts source domain class prediction values from the source domain feature values and predicts target domain class prediction values from the target domain feature values.

Filtering Step S13

In the filtering step S13, the filtering section 13 outputs filtered source domain feature values and filtered target domain feature values by filtering out one or more values from the source domain feature values with reference to the source domain class prediction values and by filtering out one or more values from the target domain feature values with reference to the target domain class prediction values.

Updating Step S14

In the updating step S14, the updating section updates at least one of the feature extraction section 11 and the class prediction section 12 with reference to a source domain classification loss computed with reference to the source domain class prediction values, a target domain classification loss computed with reference to the target domain class prediction values, and a grouping loss computed with reference to the filtered source domain feature values and the filtered target domain feature values.

Advantageous Effect

The training method S1 carried out by the training apparatus 10 explained above provides an efficient and stable training process even in a case where a small amount of target domain labeled data is available.

Configuration of Classification Apparatus

Figure 3:
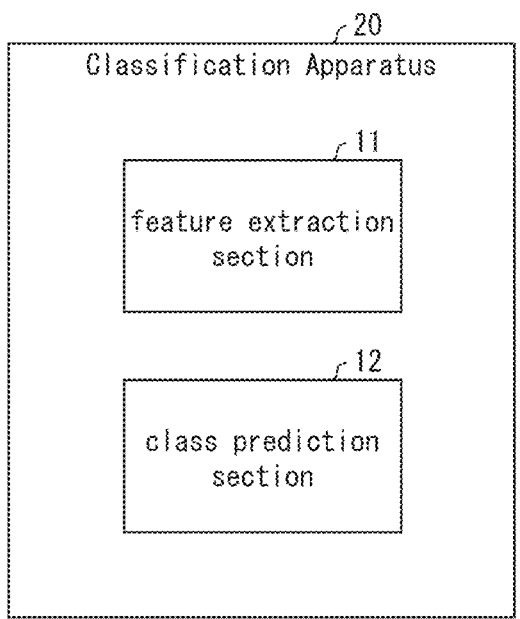
FIG. 3 is a block diagram illustrating a configuration of the classification according to the first example embodiment.

The following description will discuss a configuration of a classification apparatus 20 according to the first example embodiment with reference to FIG. 3. FIG. 3 is a block diagram illustrating a configuration of the classification apparatus 20. As illustrated in FIG. 3, the classification apparatus 20 includes a feature extraction section 11 and a class prediction section 12.

To the feature extraction section 11, target domain data is inputted. The feature extraction section 11 extracts target domain feature values from the target domain data. As explained for the training apparatus 10, at least one of the feature extraction section 11 and the class prediction section 12 has been trained with reference to filtered source domain feature values obtained by filtering out one or more values from source domain feature values, and filtered target domain feature values obtained by filtering out one or more values from target domain feature values.

The class prediction section 12 predicts target domain class prediction values from the target domain feature values.

According to the classification apparatus 20, at least one of the feature extraction section 11 and the class prediction section 12 has been trained with reference to (i) filtered source domain feature values obtained by filtering out one or more values from source domain feature values and (ii) filtered target domain feature values obtained by filtering out one or more values from target domain feature values.

Therefore, the classification apparatus 20 according to the first example embodiment provides a preferable classification process even in a case where a small amount of target domain labeled data is available.

Classification Method by Classification Apparatus

Figure 4:
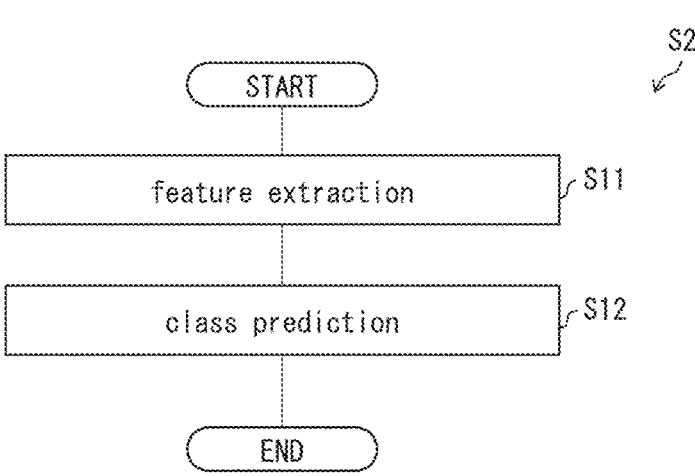
FIG. 4 is a flowchart showing a flow of a classification method according to the first example embodiment.

The following description will discuss a classification method carried out by the classification apparatus 20 according to the first example embodiment with reference to FIG. 4. FIG. 4 is a flowchart showing a classification method S2 carried out by the classification apparatus 20. As shown in FIG. 4, the classification apparatus 20 carries out a feature extraction step Sll and a class prediction step S12.

Feature Extraction Step S11

In the feature extraction step S11, the feature extraction section 11 extracts target domain feature values from target domain data. As explained for the training apparatus 10, at least one of the feature extraction section 11 and the class prediction section 12 has been trained with reference to filtered source domain feature values obtained by filtering out one or more values from source domain feature values, and filtered target domain feature values obtained by filtering out one or more values from target domain feature values.

Class Prediction Step S12

In the class prediction step S12, the class prediction section 12 predicts target domain class prediction values from the target domain feature values.

The classification method carried out by the classification apparatus 20 according to the first example embodiment provides a preferable classification process even in a case where a small amount of target domain labeled data is available.

Second Example Embodiment

The following description will discuss details of a second example embodiment of the invention with reference to the drawings. Note that the same reference numerals are given to elements having the same functions as those described in the first example embodiment, and descriptions of such elements are omitted as appropriate. Moreover, an overview of the second example embodiment is the same as the overview of the first example embodiment, and is thus not described here.

Configuration of Training Apparatus

Figure 5:
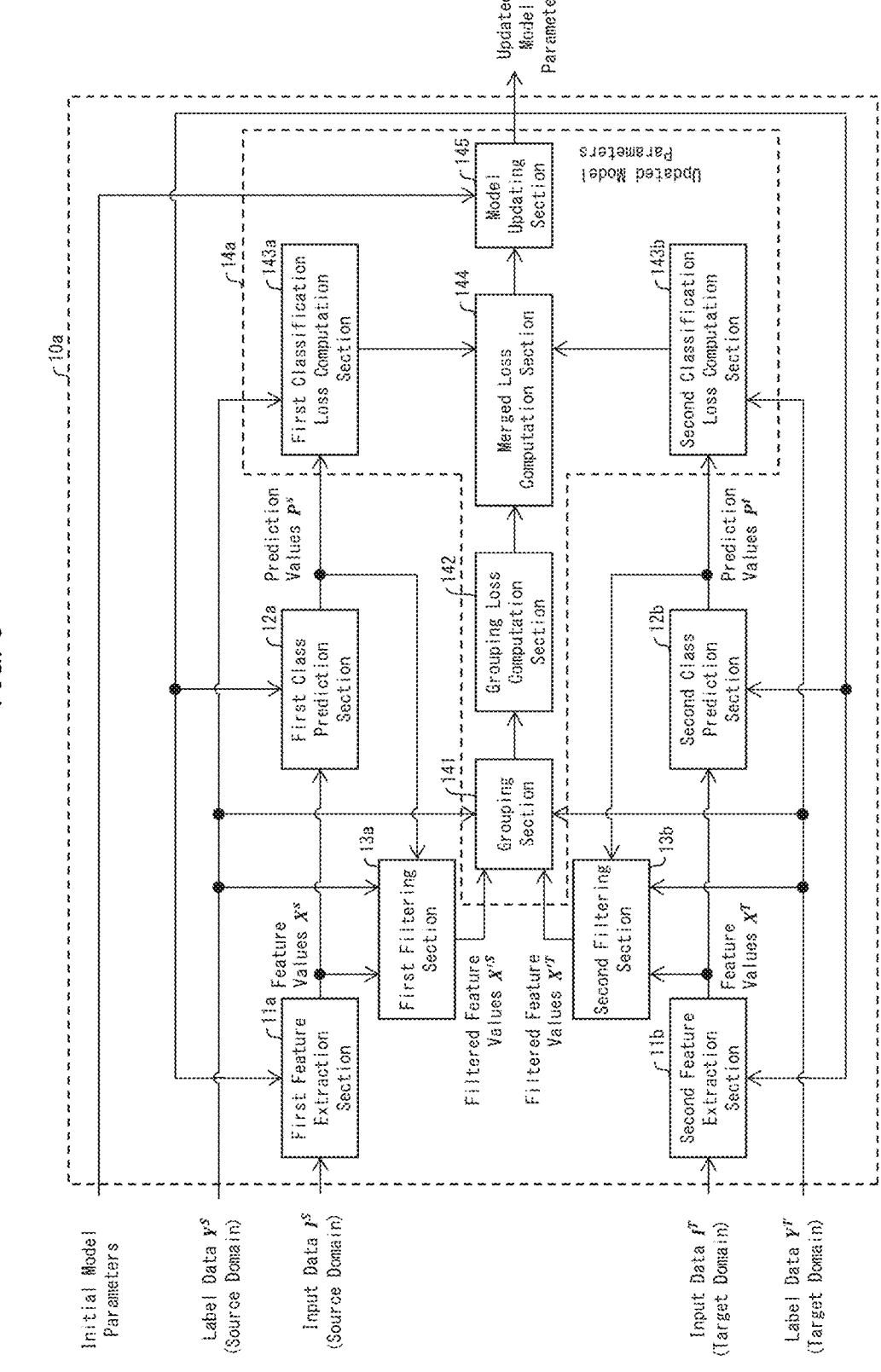
FIG. 5 is a block diagram illustrating a configuration of the training apparatus according to the second example embodiment.

The following description will discuss a configuration of a training apparatus 10a according to the second example embodiment with reference to FIG. 5. FIG. 5 is a block diagram illustrating a configuration of the training apparatus 10a. As illustrated in FIG. 5, the training apparatus 10a includes a first feature extraction section 11a, a second feature extraction section 11b, a first class prediction section 12a, a second class prediction section 12b, a first filtering section 13a, a second filtering section 13b, and an updating section 14a.

The first feature extraction section 11a and the second feature extraction section 11b is examples of the feature extraction means recited in claims. The first class prediction section 12a and the second class prediction section 12b are examples of the class prediction means recited in claims. The first filtering section 13a and the second filtering section 13b are examples of the filtering means recited in claims. The updating section 14a is an example of the updating means recited in claims.

The first feature extraction section 11a and the second feature extraction section 11b can be configured as a single section. The first class prediction section 12a and the second class prediction section 12b can be configured as a single section. The first filtering section 13a and the second filtering section 13b can be configured as a single section.

Moreover, as illustrated in FIG. 5, the updating section 14a includes a grouping section 141, a grouping loss computation section 142, a first classification loss computation section 143a, a second classification loss computation section 143b, a merged loss computation section 144, and a model updating section 145.

The first classification loss computation section 143a, a second classification loss computation section 143b can be configured as a single section.

First Feature Extraction Section

Figure 6:
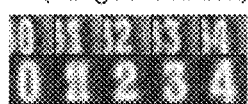
FIG. 6 is diagram showing examples of input data in the second embodiment.

To the first feature extraction section 11a, input data $I^S$ belonging to a source domain is inputted. Although any specific example of the input data $I^S$ does not limit the second example embodiment, the input data $I^S$ may be one or more input images. More specifically, as an example, input data $I^S$ may be an image which has a plurality of regions. As another example, the input image data $I^S$ may be a batch of images as depicted on the left side of FIG. 6. In the example on the left side of FIG. 6, the input data $I^S$ includes a batch of 10 images, each of which represents a number or a plurality of numbers.

The first feature extraction section 11a extracts feature values $X^S$ from source domain data $I^S$. The feature values $X^S$ extracted by the first feature extraction section 11a are supplied to the first class prediction section 12a and to the first filtering section 13a.

Note that a specific configuration of the first feature extraction section 11a does not limit the second example embodiment. For example, the first feature extraction section 11a can be a convolutional neural network (CNN), can be a recurrent neural network (RNN), or can be any of other neural networks or feature extractors. Furthermore, the first feature extraction section 11a can be any of non-learning based techniques. For example, the first feature extraction section 11a can be realized as SIFT (Scale-Invariant Feature Transform), a non-learning-based feature extraction method in which each feature value is a keypoint in the image (x,y-coordinates), and a feature value for each image is a set of keypoints. Furthermore, the first feature extraction section 11a can be realized as a manually selected/designed feature extraction method (rule-based).

Although the data structure of the feature values $X^S$ does not limit the second example embodiment, the feature values $X^S$ may be expressed as a form of a vector. More specifically, as an example, $X^S$ may be expressed as a vector such as follows.

[Math.1]

$$X^S=[x_{10}, x_{11}, x_{12}, x_{13}, x_{14}, x_{15}, x_{16}, x_{17}, x_{18}, x_{19}] \quad\text{(Eq.1)}$$

Here, $X^S$ has 10 components, which correspond to respective image of the input image batch $I^S$. Since the feature values may be expressed as a vector, the feature values may be referred to as a feature vector.

Note also that, from each image, the first feature extraction section 11a may extract 1 feature value consists of a plurality of real numbers. Therefore, we may also call the feature value as a feature vector.

Second Feature Extraction Section

In a similar manner, input data $I^T$ belonging to a target domain is inputted to the second feature extraction section 11b. Although any specific example of the input data $I^T$ does not limit the second example embodiment, the input data $I^T$ may be one or more input images. More specifically, as an example, input data $I^T$ may be an image which has a plurality of regions. As another example, the input image data $I^T$ may be a batch of images as depicted on the right side of FIG. 6. In the example on the right side of FIG. 6, the input data $I^T$ includes 10 images, each of which represents a number or a plurality of numbers.

The second feature extraction section 11b extracts feature values $X^T$ from target domain data $I^T$. The feature values $X^T$ extracted by the second feature extraction section 11b are supplied to the second class prediction section 12b and to the second filtering section 13b.

Note that a specific configuration of the second feature extraction section 11b does not limit the second example embodiment. For example, the second feature extraction section 11b can be a convolutional neural network (CNN), can be a recurrent neural network (RNN), or can be any of other neural networks or feature extractors. Furthermore, the second feature extraction section 11b can be any of non-learning based techniques. For example, the second feature extraction section 11b can be realized as SIFT (Scale-Invariant Feature Transform), a non-learning-based feature extraction method in which each feature value is a keypoint in the image (x,y-coordinates), and a feature value for each image is a set of keypoints. Furthermore, the second feature extraction section 11b can be realized as a manually selected/designed feature extraction method (rule-based).

Although the data structure of the feature values $X^T$ does not limit the second example embodiment, the feature values $X^T$ may be expressed as a form of a vector. More specifically, as an example, $X^T$ may be expressed as a vector such as follows.

[Math.2]

$$X^T=[x_{20}, x_{21}, x_{22}, x_{23}, x_{24}, x_{25}, x_{26}, x_{27}, x_{28}, x_{29}] \quad\text{(Eq.2)}$$

Here, $X^T$ has 10 components, which correspond to respective image of the input image batch $I^T$. Note also that, from each image, the second feature extraction section 11b may extract 1 feature value consists of a plurality of real numbers.

First Class Prediction Section

The first class prediction section 12a predicts source domain class prediction values $P^S$ from the source domain feature values $X^S$ extracted by the first feature extraction section 11a.

The source domain class prediction values $P^S$ which have been outputted by the first class prediction section 12a are supplied to the first filtering section 13a and to the first classification loss computation section 143a.

Here, a specific configuration of the first class prediction section 12a does not limit the second example embodiment. For example, it is possible to employ a configuration in which a corresponding component of the source domain class prediction values $P^S$ is determined by comparing each component of the source domain feature vector $X^S$ with a certain threshold.

As a specific example, from the source domain feature vector $X^S$ as indicated in (Eq. 1), the first class prediction section 12a may output the source domain class prediction values $P^S$ as follows.

[Math.3]

$$P^S = [0,1,2,3,4,0,1,2,3,4] \tag{Eq.3}$$

Here, $P^S$ has 10 components, which correspond to respective components of the feature vector $X^S$. Since the prediction values may be expressed as a vector, the prediction values may be referred to as a prediction vector.

Second Class Prediction Section

The second class prediction section 12b predicts target domain class prediction values $P^T$ from the target domain feature values $X^T$ extracted by the second feature extraction section 11b.

The target domain class prediction values $P^T$ which have been outputted by the second class prediction section 12b are supplied to the second filtering section 13b and to the second classification loss computation section 143b.

Here, a specific configuration of the second class prediction section 12b does not limit the second example embodiment. For example, it is possible to employ a configuration in which a corresponding component of the target domain class prediction values $P^T$ is determined by comparing each component of the target domain feature vector $X^T$ with a certain threshold.

As a specific example, from the target domain feature vector $X^S$ as indicated in (Eq. 1), the second class prediction section 12b may output the target domain class prediction values $P^T$ as follows.

[Math.4]

$$P^T = [0,2,2,3,4,0,3,2,3,4] \tag{Eq.4}$$

Here, $P^T$ has 10 components, which correspond to respective components of the feature vector $X^T$.

First Filtering Section

The first filtering section 13a computes filtered source domain feature values $X'^S$ by filtering out one or more values from the source domain feature values $X^S$ with reference to the source domain class prediction values $P^S$.

The filtered source domain feature values $X'^S$ which have been computed by the first filtering section 13a are supplied to the grouping section 141.

Although filtering conditions adopted by the first filtering section 13a do not limit the second example embodiment, it is possible to employ the following exemplary configuration.

The first filtering section 13a may receive source domain class label data $Y^S$. Here, the source domain class label data $Y^S$ is associated with the source domain input data $I^S$, and indicates ground truth labels for the source domain input data $I^S$. As a specific example, in a case where the input data $I^S$ is image data as depicted on the left side of FIG. 6, the source domain class label data $Y^S$ may be expressed as follows.

[Math.5]

$$Y^S = [0,1,2,3,4,0,1,2,3,4] \tag{Eq.5}$$

Here, $Y^S$ has 10 components, which correspond to respective image of the input image batch $I^S$. Since the class label data may be expressed as a vector, the class label data may be referred to as a class label vector.

Then, the first filtering section 13a may filter out one or more components from the source domain feature vector $X^S$ with reference to (i) each component of the source domain class prediction vector $P^S$ and (ii) each component of the source domain class label vector $Y^S$. More specifically, the first filtering section 13a may filter out, from the source domain feature vector $X^S$, one or more components which are not consistent with the corresponding components of the source domain class label vector $Y^S$.

As a specific example, in a case where $P^S$ is given by Eq. 3 and $Y^S$ is given by Eq. 5, the first filtering section 13a may not filter out any components of the feature vector, because the components of $P^S$ match corresponding components of $Y^S$, respectively. Therefore, in this specific example, the filtered source domain feature vector $X'^S$ computed by the first filtering section 13a may be expressed as follows.

[Math.6]

$$X'^S[x_{10}, x_{11}, x_{12}, x_{13}, x_{14}, x_{15}, x_{16}, x_{17}, x_{18}, x_{19}] \tag{Eq.6}$$

Second Filtering Section

The second filtering section 13b computes filtered target domain feature values $X'^T$ by filtering out one or more values from the target domain feature values $X^T$ with reference to the target domain class prediction values $P^T$.

The filtered target domain feature values $X'^T$ which have been computed by the second filtering section 13b are supplied to the grouping section 141.

Although filtering conditions adopted by the second filtering section 13b do not limit the second example embodiment, it is possible to employ the following exemplary configuration.

The second filtering section 13b may receive target domain class label data $Y^T$. Here, the target domain class label data $Y^T$ is associated with the target domain input data $I^T$, and indicates ground truth labels for the target domain input data $I^T$. As a specific example, in a case where the input data $I^T$ is image data as depicted on the left side of FIG. 6, the target domain class label data $Y^T$ may be expressed as follows.

[Math.7]

$$Y^T=[0,1,2,3,4,0,1,2,3,4] \tag{Eq.7}$$

Here, $Y^T$ has 10 components, which correspond to respective image of the input image batch $I^T$.

Then, the second filtering section 13b may filter out one or more components from the target domain feature vector $X^T$ with reference to (i) each component of the target domain class prediction vector $P^T$ and (ii) each component of the target domain class label vector $Y^T$. More specifically, the second filtering section 13b may filter out, from the target domain feature vector $X^T$, one or more components which are not consistent with the corresponding components of the target domain class label vector $Y^T$.

As a specific example, in a case where $P^T$ is given by Eq. 4 and $Y^T$ is given by Eq. 7, the 2nd component of $P^T$ does not match the 2nd component of $Y^T$, and the 7th component of $P^T$ does not match the 7th component of $Y^T$.

Therefore, in this specific example, the second filtering section 13b may filter out the 2nd component and the 7th component of the target domain feature vector $X^T$. Thus, in this specific example, the filtered target domain feature vector $X'^T$ computed by the second filtering section 13b may be expressed as follows.

[Math.8]

$$X'^T=[x_{20}, x_{22}, x_{23}, x_{24}, x_{25}, x_{27}, x_{28}, x_{29}] \tag{Eq.8}$$

Here, the strikethrough indicates the filtered-out components of $X'^T$.

Grouping Section

The grouping section 141 generates, from the filtered source domain feature values $X'^S$ and the filtered target domain feature values $X'^T$, class groups where each class group contains feature values sharing the same class label.

As a specific example, in a case where $X'^S$ is given by Eq. 6 and $X'^T$ is given by Eq. 8, the grouping section 141 outputs the following class groups (Gr0, Gr1, Gr2, Gr3, Gr4).

[Math.9]

Gr0: $x_{10}, x_{15}, x_{20}, x_{25}$

Gr1: $x_{11}, x_{16}$

Gr2: $x_{12}, x_{17}, x_{22}, x_{27}$

Gr3: $x_{13}, x_{18}, x_{23}, x_{28}$

Gr4: $x_{14}, x_{19}, x_{24}, x_{29}$ (Eq.9)

Here, the Gr0 is a class group whose feature values share the same class label 0. The Gr1 is a class group whose feature values share the same class label 1. Similarly, each of Gr2, Gr3, and Gr4 is a class group whose feature values share the same class label 2, 3, or 4.

Grouping Loss Computation Section

The grouping loss computation section 142 computes the grouping loss (Loss_grouping) with reference to the class groups generated by the grouping section 141.

For example, the grouping loss computation section 142 computes the grouping loss based on (i) intra class metrics determined with reference to the feature values in a same class and (ii) inter class metrics determined with reference to the feature values in different classes.

As a specific example, the grouping loss computation section 142 computes the grouping loss using the following mathematical formula.

[Math. 10]

$$Loss_{grouping} = \frac{1}{n} \sum_{x \in (X^S \cup X^T)} \left((\text{maximum of intra−class distance in the feature space}) - (\text{minimum of intra−class distance in the feature space}) + (\text{margin})\right) \tag{Eq. 10}$$

Here, for each feature value x in a union set of all the source domain feature values and all the target domain feature values, a "maximum of intra-class distance in the feature space" of that feature value x is computed as the maximum distance between the feature value x and any other feature value which comes from the same class group as x, and a "minimum of inter-class distance in the feature space" is computed as the minimum distance between the feature value x and any other feature value which comes from a different class group from x. The margin indicates an allowable minimum value for the value computed by subtracting the feature value's maximum intra-class distance from the feature value's minimum inter-class distance. Hereinafter, the value computed for each feature value by (maximum of intra-class distance in the feature space−minimum of inter-class distance in the feature space+margin) is referred to as "individual grouping loss". The overall grouping loss is computed as the average of individual grouping loss for each source domain feature value and each target domain feature value. The average is computed by first computing the summation of the individual grouping loss for all source domain feature values and all target domain feature values, and then dividing the sum by the number of the source domain feature values plus the number of the target domain feature values.

More specifically, the computation of grouping loss (Loss_grouping) according to Eq. 10 may be expressed as follows.

The grouping loss computation section 142 may first find, for each feature value x, among all other feature values from the same class group as that feature value x, another feature value that is the most distant from that feature value x in the feature space. This type of pair may be referred to as an intra-class pair. The distance between the intra-class pair for each feature value corresponds to the "maximum of intra-class distance in the feature space" in Eq.10.

The grouping loss computation section 142 may then find, for each feature value x, among all other feature values from a different class group from that feature value x, another feature value that is the closest to that feature value x in the feature space. This type of pair may be referred to as an inter-class pair. The distance between the inter-class pair for each feature value corresponds to the "minimum of inter-class distance in the feature space" in Eq.10.

Then, the grouping loss computation section 142 may subtract (minimum of inter-class distance in the feature space) from (maximum of intra-class distance in the feature space) for each feature value.

The grouping loss computation section 142 may then add a margin. Adding the margin means that we want the quantity of (maximum of intra-class distance in the feature space) smaller than (minimum of inter-class distance in the feature space) to be at least a certain value (e.g. if margin=1, we want that, for each feature value, (maximum of intra-class distance in the feature space) to be at least 1 unit smaller than (minimum of inter-class distance in the feature space).

After carrying out the above calculation for each feature value, the grouping loss computation section 142 may then take the summation over all the feature values included in the union of $X^S$ and $X^T$.

The grouping loss computation section 142 may then divide the result of the summation by the number of all the feature values. The number of all the feature values is expressed as n in Eq. 10. As a specific example, in a case where we have the class groups of Eq. 9, we may take n=18.

First Class Classification Loss Computation Section

The first class classification loss computation section 143a computes a source domain classification loss (Loss_classification_S) with reference to (i) the source domain class prediction values $P^S$ and (ii) the source domain class label data $Y^S$.

For example, the first class classification loss computation section 143a computes a source domain classification loss according to a degree of mismatch between $P^S$ and $Y^S$.

As a specific example, in a case where $P^S$ is given by Eq. 3 and $Y^S$ is given by Eq. 5, the first class classification loss computation section 143a computes the source domain classification loss as below, because all the components of $P^S$ match the corresponding components of $Y^S$, respectively.

[Math.11]

$$\text{Loss}_{classification\ S} = 0 \qquad (Eq.11)$$

Second Class Classification Loss Computation Section

The second class classification loss computation section 143b computes a target domain classification loss (Loss_classification_T) with reference to (i) the target domain class prediction values $P^T$ and (ii) the target domain class label data $Y^T$.

For example, the second class classification loss computation section 143b computes a target domain classification loss according to a degree of mismatch between $P^T$ and $Y^T$.

As a specific example, in a case where $P^T$ is given by Eq. 4 and $Y^T$ is given by Eq. 7, the second class classification loss computation section 143b computes the target domain classification loss as below, because the 2nd component of $P^T$ does not match the 2nd component of $Y^T$, and the 7th component of $P^T$ does not match the 7th component of $Y^T$.

[Math.12]

$$\text{Loss}_{classification\ T} = 2 \qquad (Eq.\ 12)$$

Merged Loss Computation Section

The merged loss computation section 144 computes a merged loss (Loss_merge) with reference to the source domain classification loss (Loss_classification_S), the target domain classification loss (Loss_classification_T) and the grouping loss (Loss_grouping).

For example, the merged loss computation section 144 computes a merged loss as follows.

[Math.13]

$$\text{Loss}_{merge} = \alpha \text{Loss}_{classification\ S} + \beta \text{Loss}_{classification\ S} + \gamma \text{Loss}_{grouping} \qquad (Eq.\ 13)$$

Here, the coefficients $\alpha$, $\beta$, and $\gamma$ indicate weight coefficients whose specific values do not limit the second example embodiment.

Model Updating Section 145

The model updating section 145 determines whether the merged loss is converged or not. If the merged loss is converged, the model updating section 145 outputs the converged model parameters to a storage medium. If the merged loss is not converged, the model updating section 145 updates model parameters for the first feature extraction section 11a, the second feature extraction section 11b, the first class prediction section 12a, and the second class prediction section 12b, with reference to the merged loss computed by the merged loss computation section 144.

For example, the model updating section 145 updates the model parameters such that the merged loss decreases. Although updating methods adopted by the model updating section 145 do not limit the second example embodiment, the model updating section 145 may update the model parameters according to a back propagation method.

The model parameters updated by the model updating section 145 are supplied to the first feature extraction section 11a, the second feature extraction section 11b, the first class prediction section 12a, and the second class prediction section 12b.

Advantageous Effect

According to the second example embodiment, as mentioned above, the model updating section 145 updates the model parameters with reference to the grouping loss in addition to the source domain classification loss and the target domain classification loss. Therefore, according to the second example embodiment, the second feature extraction section 11b and the second class prediction section 12b can be trained even in a case where a small amount of target domain labeled data is available.

Furthermore, according to the second example embodiment, as mentioned above, the first filtering section 13a and the second filtering section 13b compute the filtered source domain feature values and the filtered target domain feature values, and the model updating section 145 updates the model parameters with reference to the grouping loss in addition to the source domain classification loss and the target domain classification loss. Here, as explained above, the grouping loss is obtained with reference to the filtered source domain feature values and the filtered target domain feature values.

Therefore, according to the second example embodiment, outliers which may be included in the source domain feature values and in the target domain feature values can be filtered out by the first filtering section 13a and the second filtering section 13b, and do not destabilize the training process of the first feature extraction section 11a, the second feature extraction section 11b, the first class prediction section 12a, and the second class prediction section 12b.

Figure 7:
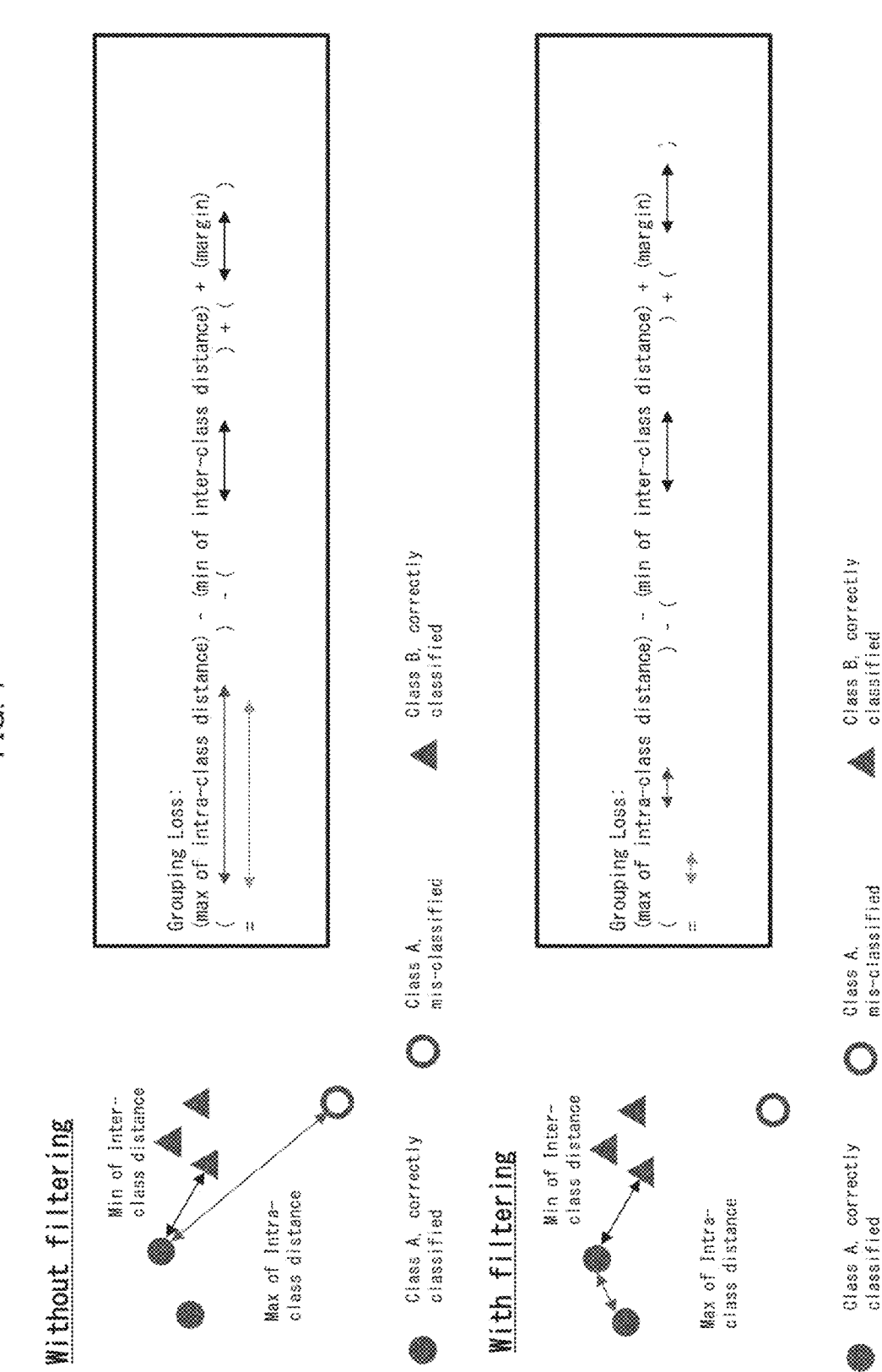
FIG. 7 is a diagram schematically illustrating grouping losses in the second example embodiment.

The following description will discuss the above feature with reference to FIG. 7. The upper half part of FIG. 7 is a diagram schematically illustrating a grouping loss in a case where filtering is not carried out by the first filtering section 13a and the second filtering section 13b. As shown in the upper half part of FIG. 7, in a case where filtering is not carried out by the first filtering section 13a and the second filtering section 13b, a grouping loss value becomes improperly greater due to a contribution of misclassified outlier. Therefore, even if models are to be updated with use of such a grouping loss, the loss is not converged and thus training cannot be carried out properly.

Meanwhile, the lower half part of FIG. 7 is a diagram schematically illustrating a grouping loss in a case where filtering is carried out by the first filtering section 13a and the second filtering section 13b. As shown in the lower half part of FIG. 7, in a case where filtering is carried out by the first filtering section 13a and the second filtering section 13b, the mis-classified outlier does not contribute to the grouping loss. By thus updating models with use of such a grouping loss, the loss is converged and it is therefore possible to properly carry out training.

Therefore, the training apparatus 10a according to the second example embodiment provides an efficient and stable training process even in a case where a small amount of target domain labeled data is available.

Training Method by Training Apparatus

Figure 8:
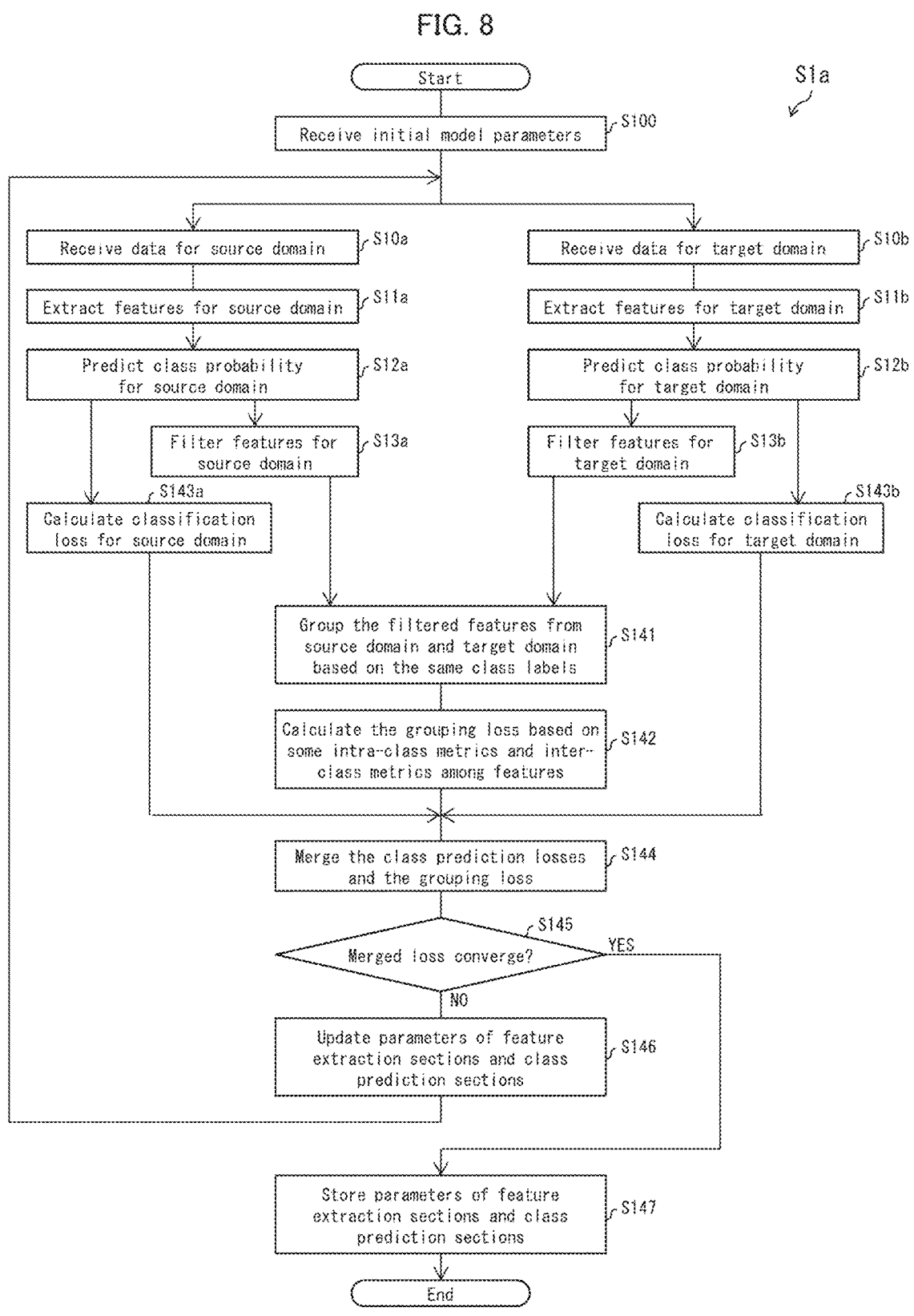
FIG. 8 is a flowchart showing a flow of a training method according to the second example embodiment.

The following description will discuss a training method carried out by the training apparatus 10a according to the second example embodiment, with reference to FIG. 8. FIG. 8 is a flowchart showing a flow of a training method S1a carried out by the training apparatus 10a.

Step S100

In the step S100, the training apparatus 10a receives initial model parameters. The initial model parameters include initial model parameters for the first feature extraction section 11a, the second feature extraction section 11b, the first class prediction section 12a, and the second class prediction section 12b. The initial model parameters received in this step are supplied to the first feature extraction section 11a, the second feature extraction section 11b, the first class prediction section 12a, and the second class prediction section 12b.

Step S10a

In the step S10a, the training apparatus 10a receives data for the source domain. More specifically, the training apparatus 10a receives source domain input data $I^S$ and source domain class label data $Y^S$ associated with the input data $I^S$.

Step S10b

In the step S10b, the training apparatus 10a receives data for the target domain. More specifically, the training apparatus 10a receives target domain input data $I^T$ and target domain class label data $Y^T$ associated with the input data $I^T$.

Step S11a

In the step S11a, the first feature extraction section 11a extracts feature values $X^S$ from source domain data $I^S$. A specific process carried out by the first feature extraction section 11a is described above and is therefore not repeatedly described here.

Step S11b

In the step S11b, the second feature extraction section 11b extracts feature values $X^T$ from target domain data $I^T$. A specific process carried out by the second feature extraction section 11b is described above and is therefore not repeatedly described here.

Step S12a

In the step S12a, the first class prediction section 12a predicts source domain class prediction values $P^S$ from the source domain feature values $X^S$ extracted by the first feature extraction section 11a. A specific process carried out by the first class prediction section 12a is described above and is therefore not repeatedly described here.

Step S12b

In the step S12b, the second class prediction section 12b predicts target domain class prediction values $P^T$ from the target domain feature values $X^T$ extracted by the second feature extraction section 11b. A specific process carried out by the second class prediction section 12b is described above and is therefore not repeatedly described here.

Step S13a

In the step S13a, the first filtering section 13a computes filtered source domain feature values $X'^S$ by filtering out one or more values from the source domain feature values $X^S$ with reference to the source domain class prediction values $P^S$. A specific process carried out by the first filtering section 13a is described above and is therefore not repeatedly described here.

Step S13b

In the step S13b, the second filtering section 13b computes filtered target domain feature values $X'^T$ by filtering out one or more values from the target domain feature values $X^T$ with reference to the target domain class prediction values $P^T$. A specific process carried out by the second filtering section 13b is described above and is therefore not repeatedly described here.

Step S141

In the step S141, the grouping section 141 generates and outputs, from the filtered source domain feature values $X'^S$ and the filtered target domain feature values $X'^T$, class groups where each class group contains feature values sharing the same class label. A specific process carried out by the grouping section 141 is described above and is therefore not repeatedly described here.

Step S142

In the step S142, the grouping loss computation section 142 computes the grouping loss (Loss_grouping) with reference to the class groups generated by the grouping section 141. A specific process carried out by the grouping loss computation section 142 is described above and is therefore not repeatedly described here.

Step S143a

In the step S143a, the first class classification loss computation section 143a computes a source domain classification loss (Loss_classification_S) with reference to the source domain class prediction values $P^S$ and the source domain class label data $Y^S$. A specific process carried out by the first class classification loss computation section 143a is described above and is therefore not repeatedly described here.

Step S143b

In the step S143b, the second class classification loss computation section 143b computes a target domain classification loss (Loss_classification_T) with reference to the target domain class prediction values $P^T$ and the target domain class label data $Y^T$. A specific process carried out by the second class classification loss computation section 143b is described above and is therefore not repeatedly described here.

Step S144

In the step S144, the merged loss computation section 144 computes a merged loss (Loss_merge) with reference to the source domain classification loss (Loss_classification_S), the target domain classification loss (Loss_classification_T) and the grouping loss (Loss_grouping). A specific process carried out by the merged loss computation section 144 is described above and is therefore not repeatedly described here.

Step S145

In the step S145, the model updating section 145 determines whether the merged loss is converged or not. If the merged loss is converged (YES in the step S145), the process proceeds to the step S147. If the merged loss is not converged (NO in the step S145), the process proceeds to the step S146.

Step S146

In the step S146, the model updating section 145 updates model parameters for the first feature extraction section 11a, the second feature extraction section 11b, the first class prediction section 12a, and the second class prediction section 12b, with reference to the merged loss computed by the merged loss computation section 144.

Step S147

In the step S147, the model updating section 145 stores, in a storage medium, the model parameters for the first feature extraction section 11a, the second feature extraction section 11b, the first class prediction section 12a, and the second class prediction section 12b, with reference to the merged loss computed by the merged loss computation section 144.

Note that the order of the steps in the training method S1a does not limit the second example embodiment. For example, in the training method S1a, the step S143a and the step S143b can be carried out before the step S13a and the step S13b, respectively. Alternatively, the step S143a and the step S143b can be carried out after at least any of the step S141 and the step S142.

Advantageous Effect

The training method S1a carried out by the training apparatus 10a explained above provides an efficient and stable training process even in a case where a small amount of target domain labeled data is available.

Configuration of Classification Apparatus

Figure 9:
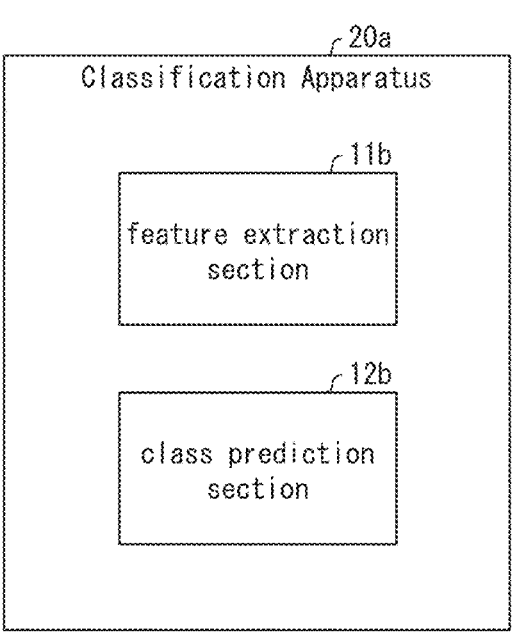
FIG. 9 is a block diagram illustrating a configuration of the classification apparatus according to the second example embodiment.

The following description will discuss a configuration of the classification apparatus 20a according to the second example embodiment with reference to FIG. 9. FIG. 9 is a block diagram illustrating a configuration of the classification apparatus 20a. As illustrated in FIG. 9, the classification apparatus 20a includes a feature extraction section 11b and a class prediction section 12b. Here, the feature extraction section 11b is configured in a manner similar to that of the above described second feature extraction section 11b, and the class prediction section 12b is configured in a manner similar to that of the above described second class prediction section 12b.

According to the classification apparatus 20a, the feature extraction section 11b and the class prediction section 12b have been trained with reference to (i) filtered source domain feature values obtained by filtering out one or more values from source domain feature values and (ii) filtered target domain feature values obtained by filtering out one or more values from target domain feature values.

Therefore, the classification apparatus 20a according to the second example embodiment provides a preferable classification process even in a case where a small amount of target domain labeled data is available.

Remarks on Second Example Embodiment

Remark 1: On Feature Extraction Section

In an exemplary configuration, the first feature extraction section 11a and the second feature extraction section 11b may be completely independent from each other. In other words, the first feature extraction section 11a and the second feature extraction section 11b share neither model parameters nor layers.

In another exemplary configuration, the first feature extraction section 11a and the second feature extraction section 11b may share one or some of the model parameters. In other words, the first feature extraction section 11a and the second feature extraction section 11b may share one or some of the layers.

For example, the first feature extraction section 11a and the second feature extraction section 11b may share first several layers in which low-level features such as edges, corners, etc. are extracted. Alternatively, the first feature extraction section 11a and the second feature extraction section 11b may share last several layers in which high-level features or abstract features such as semantic meanings, etc. are extracted.

In yet another exemplary configuration, the first feature extraction section 11a and the second feature extraction section 11b may share all of the model parameters. In other words, the first feature extraction section 11*a* and the second feature extraction section 11*b* may share all the layers.

Remark 2: On Class Prediction Section

In an exemplary configuration, the first class prediction section 12*a* and the second class prediction section 12*b* may be completely independent from each other. In other words, the first class prediction section 12*a* and the second class prediction section 12*b* share neither model parameters nor layers.

In another exemplary configuration, the first class prediction section 12*a* and the second class prediction section 12*b* may share one or some of the model parameters. In other words, the first class prediction section 12*a* and the second class prediction section 12*b* may share one or some of the layers.

In yet another exemplary configuration, the first class prediction section 12*a* and the second class prediction section 12*b* may share all of the model parameters. In other words, the first class prediction section 12*a* and the second class prediction section 12*b* may share all the layers.

Remark 3: On Grouping Loss

Computation of the grouping loss may be achieved by any method for computing the distance or similarity between two features in the class groups. The grouping loss may be L1 norm, L2 norm, cosine similarity, or even some other measure which requires learning, etc.

Moreover, in an exemplary configuration, after computing the grouping loss, the grouping loss computation section 142 may carry out some post-processing manipulation such as resealing on the grouping loss so that the grouping loss is resealed within a safer range, such as within [0,1). As a specific example, the grouping loss computation section 142 may compute a post-processed grouping loss (Loss_grouping_pp) by resealing the grouping loss (Loss_grouping) as follows.

[Math. 14]

$$\text{Loss}_{grouping-pp} = \qquad\qquad\qquad\qquad\qquad (\text{Eq. 14})$$
$$\frac{1}{n}\sum\nolimits_{x\in(X^S\cup X^T)} 1 - e^{-max(dist_{max-intra}-dist_{min-inter}+margin,0)}$$

The resealing is carried out in view of the following problem. That is, even in a case of high quality features, a distance, based on which the loss is computed, can still be very large, and this results in a large loss. There are different ways to rescale the grouping loss within a safe range, such as a simple clipping (If Loss_grouping>1, return 1; else return Loss_grouping); or a simple linear reweighting with a weight $\lambda$ ($\lambda$Loss_grouping); or any more complex formula.

Remark 4: On Merging Loss

The merging loss can be a direct sum of all the subtask losses such as the source domain classification loss (Loss_classification_S), the target domain classification loss (Loss_classification_T) and the grouping loss (Loss_grouping), or can be a weighted sum of the subtask losses.

The weight of sum may vary in accordance with the training progress (e.g., at early training iterations, the weight of classification loss is high, and then the weight decays as the number of trained iterations increases). The weight may also be a weight which requires learning.

Remark 5: On Filtering Rules

The rule of determining whether to filter out a feature value may vary. As a 1st example, the rule may depend on the correctness of the predictions given by the first class prediction section 12*a* or the second class prediction section 12*b*.

More specifically, if the label data (true labels of features) are [0,1,1,1] while the predictions given by the class prediction section for the same batch of features are [0,1,0,1], only the 3rd feature is wrongly predicted and therefore only the 3rd feature may be filtered out by the filtering section.

As a 2nd example, the rule may depend on the confidence of the predictions. More specifically, if (i) the true labels of features are [0,1,1,1] while the confidence of predictions for the same batch of features are [[0.7,0.3], [0.45,0.55], [0.6, 0.4], [0.2,0.8]], and (ii) the threshold of confidence is set to be equal to 0.6, then for the 1st feature, the model says it has the confidence score (indicating confidence that the feature belongs to its true class (i.e., index 0)) of 0.7 which is larger than the threshold, and thus the feature can be safely passed to a next stage. For the 2nd feature, although the model is confident that the feature should belong to its true class (i.e., index 1), the confident score is lower than the threshold (0.55<0.6), and thus the filter section may reject this feature. For the 3rd feature, the confidence that the feature belongs to its true class (i.e., index 1) is only 0.4, and thus this feature may also be rejected. The confident threshold may be manually picked, or may be a threshold which requires learning.

Third Example Embodiment

The following description will discuss details of a third example embodiment of the present invention with reference to the drawings. Note that the same reference numerals are given to elements having the same functions as those described in the foregoing example embodiments, and descriptions of such elements are omitted as appropriate. Moreover, an overview of the third example embodiment is the same as the overview of the foregoing example embodiments, and is thus not described here.

Configuration of Training Apparatus

Figure 10:
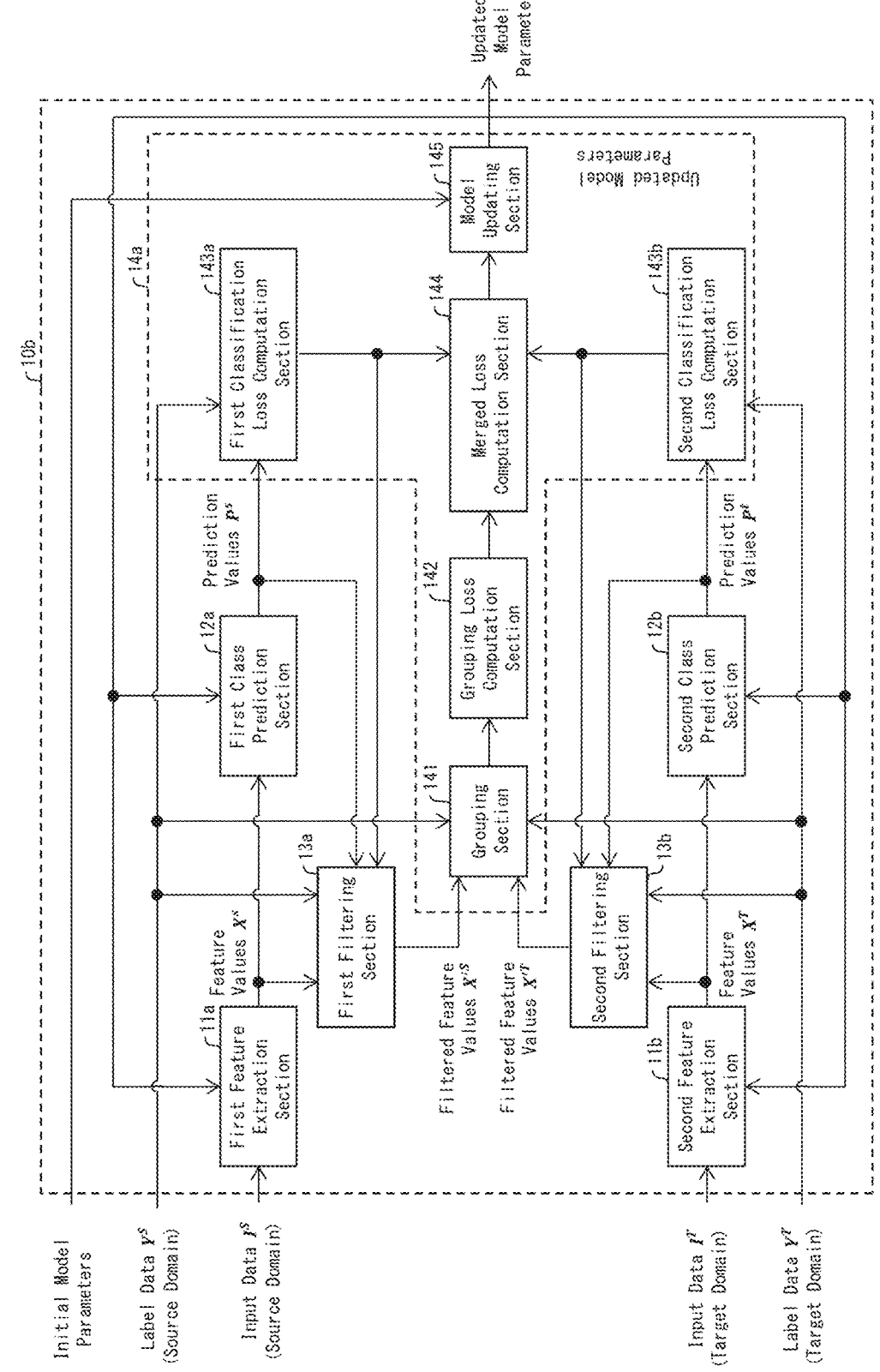
FIG. 10 is a block diagram illustrating a configuration of the training apparatus according to the third example embodiment.

The following description will discuss a configuration of a training apparatus 10*b* according to the third example embodiment with reference to FIG. 10. FIG. 10 is a block diagram illustrating a configuration of the training apparatus 10*b*. As illustrated in FIG. 10, the third example embodiment is different from the second example embodiment in that a source domain classification loss (Loss_classification_S) is inputted to the first filtering section 13*a*, and a target domain classification loss (Loss_classification_T) is inputted to the second filtering section 13*b*.

In the third example embodiment, the first filtering section 13*a* further refers to the source domain classification loss. The second filtering section 13*b* further refers to the target domain classification loss.

As an example, the first filtering section 13*a* may filter out one or more components from the source domain feature vector $X^S$ with reference to (i) each component of the source domain class prediction vector $P^S$, (ii) each component of the source domain class label vector $Y^S$, and (iii) the source domain classification loss.

In a similar manner, the second filtering section 13b may filter out one or more components from the target domain feature vector $X^T$ with reference to (i) each component of the target domain class prediction vector $P^T$, (ii) each component of the target domain class label vector $Y^T$, and (iii) the target domain classification loss.

As another example, the first filtering section 13a may be switched off during a training process, in a case where the source domain classification loss is lower than a threshold TH1. The threshold TH1 may be selected manually.

In a similar manner, the second filtering section 13b may be switched off during a training process, in a case where the target domain classification loss is lower than a threshold TH2. The threshold TH2 may be or may not be the same value as TH1. The threshold TH2 may be selected manually.

After some training epochs, even though a feature is wrongly classified, such a feature is not too far away from the other features and is thus worth being considered. To determine a stage in which wrongly-classified-but-worth-considered features are used in the computation of grouping loss, it is possible to use the classification loss as guidance as explained above.

Advantageous Effect

According to the third example embodiment, the wrongly-classified-but-worth-considered features can be appropriately used in the training process.

Configuration of Classification Apparatus

The classification apparatus 20b according to the third example embodiment has a configuration similar to that of the classification apparatus 20a according to the second example embodiment. Note, however, that, as above described, the first filtering section 13a further refers to the source domain classification loss in the training process and the second filtering section 13b further refers to the target domain classification loss in the training process in the third example embodiment.

Therefore, the classification apparatus 20b according to the third example embodiment provides a preferable classification process.

Fourth Example Embodiment

The following description will discuss details of a fourth example embodiment of the present invention with reference to the drawings. Note that the same reference numerals are given to elements having the same functions as those described in the foregoing example embodiments, and descriptions of such elements are omitted as appropriate. Moreover, an overview of the fourth example embodiment is the same as the overview of the foregoing example embodiments, and is thus not described here.

Configuration of Training Apparatus

Figure 11:
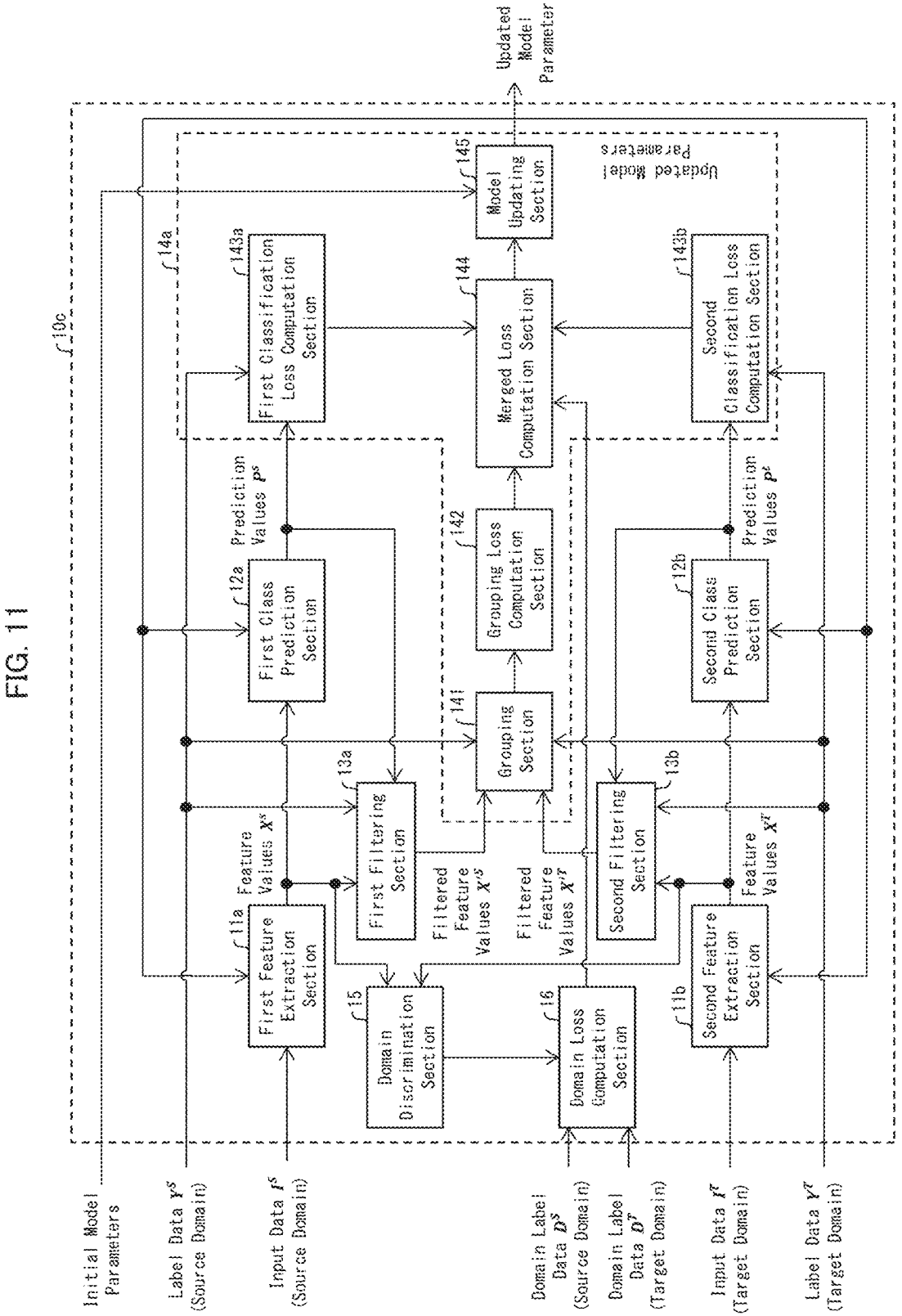
FIG. 11 is a block diagram illustrating a configuration of the training apparatus according to the fourth example embodiment.

The following description will discuss a configuration of a training apparatus 10c according to the fourth example embodiment with reference to FIG. 11. FIG. 11 is a block diagram illustrating a configuration of the training apparatus 10c. As illustrated in FIG. 11, the training apparatus 10c includes a domain discrimination section 15 and a domain loss computation section 16, in addition to the constituent elements included in the training apparatus 10a according to the second example embodiment.

Domain Discrimination Section

The domain discrimination section 15 carries out a discrimination process to discriminate the target domain from the source domain. In other words, the domain discrimination section 15 carries out domain prediction which indicates whether a feature is from the source domain or from the target domain.

For example, the domain discrimination section 15 carries out the following processes. The domain discrimination section 15 receives the source domain feature values $X^S$ extracted by the first feature extraction section 11a and the target domain feature values $X^T$ extracted by the second feature extraction section 11b. Then, the domain discrimination section 15 carries out a discrimination process to discriminate the source domain feature values $X^S$ from the target domain feature values $X^T$ without referring to any information regarding which domain the feature belongs to. Then, the domain discrimination section 15 outputs a result of the discrimination process.

As a specific example, in a case where the feature values $X^S$ are given by Eq. 1, the domain discrimination section 15 may output a result $DP^S$ of the discrimination process for the feature values $X^S$ as follows.

[Math.15]

$$DP^S=[S,S,T,S,T,S,S,T,S,T] \tag{Eq.15}$$

Moreover, as a specific example, in a case where the feature values $X^T$ are given by Eq. 2, the domain discrimination section 15 may output a result $DP^T$ of the discrimination process for the feature values $X^T$ as follows.

[Math.16]

$$DP^T=[T,T,T,S,T,T,T,T,S,T] \tag{Eq.16}$$

Domain Loss Computation Section

The domain loss computation section 16 computes and outputs a domain discrimination loss with reference to the result of the discrimination process carried out by the domain discrimination section 15. The domain discrimination loss may also simply be referred to as a domain loss.

For example, the domain loss computation section 16 receives (i) source domain label data $D^S$ which indicates ground truth domain labels for the source domain and (ii) target domain label data $D^T$ which indicates ground truth domain labels for the target domain. As a specific example, the source domain label data $D^S$ and the target domain label data $D^T$ may be expressed as follows.

[Math.17]

$$D^S=[S,S,S,S,S,S,S,S,S,S] \tag{Eq.17}$$

[Math.18]

$$D^T=[T,T,T,T,T,T,T,T,T,T] \tag{Eq.18}$$

The domain loss computation section 16 computes a domain loss according to (i) a degree of mismatch between $DP^S$ and $D^S$ and (ii) a degree of mismatch between $DP^T$ and $D^T$.

As a specific example, in a case where $DP^S$ is given by Eq. 15, $D^S$ is given by Eq. 17, $DP^T$ is given by Eq. 16, and $D^T$ is given by Eq. 18, the domain loss computation section 16 computes a domain loss (Loss_domain) as below, because two components in $DP^S$ are different from corresponding components in $D^S$, and four components in $DP^T$ are different from corresponding components in $D^T$.

[Math.19]

$$\text{Loss}_{domain}=2+4=6 \tag{Eq.19}$$

Merged Loss Computation Section

The merged loss computation section 144 according to the fourth example embodiment computes a merged loss (Loss_merge) with reference to the source domain classification loss (Loss_classification_S), the target domain classification loss (Loss_classification_T), the grouping loss (Loss_grouping), and the domain loss (Loss_domain).

For example, the merged loss computation section 144 according to the fourth example embodiment computes a merged loss as follows.

[Math.20]

$$\text{Loss}_{merge}=\alpha\text{Loss}_{classification\ S}+\beta\text{Loss}_{classification\ T}+$$
$$\gamma\text{Loss}_{grouping}-\delta\text{Loss}_{domain} \tag{Eq.20}$$

Here, the coefficients $\alpha$, $\beta$, $\gamma$, and $\delta$ indicate weight coefficients whose specific values do not limit the fourth example embodiment. Note that the sign in front of the domain loss is minus. This means that the model updating section 145 updates the model parameters for the first feature extraction section 11a and the second feature extraction section 11b such that the extracted features may cause a discrimination result by the domain discrimination section 15 to become less accurate. In other words, the model updating section 145 updates the model parameters for the first feature extraction section 11a and the second feature extraction section 11b such that the extracted features may confuse the domain discrimination section 15.

Furthermore, the model updating section 145 may update, with reference to the merged loss (Loss_merge), the model parameters for the domain discrimination section 15 in addition to the first feature extraction section 11a, the second feature extraction section 11b, the first class prediction section 12a and the second class prediction section 12b.

Furthermore, the model updating section 145 may update the domain discrimination section 15 with reference to the domain loss (Loss_domain) in addition to updating the first feature extraction section 11a, the second feature extraction section 11b, the first class prediction section 12a and the second class prediction section 12b with reference to the merged loss (Loss_merge).

Training by the Training Apparatus

From the viewpoint of training, the training apparatus 10c carries out the following processes. First, the training apparatus 10c trains the domain discrimination section 15 so that the domain discrimination section 15 can tell whether a feature is from a source domain or from a target domain. Second, the training apparatus 10c trains the first feature extraction section 11a and the second feature extraction section 11b to extract features that can confuse the trained domain discrimination section 15.

By iterating the above processes, the training apparatus 10c may achieve a situation that the well-trained domain discrimination section 15 cannot tell whether a feature is from the source domain or from the target domain. This means that the feature has a very good domain confusion property, or in other words, a domain invariant property.

Figure 12:
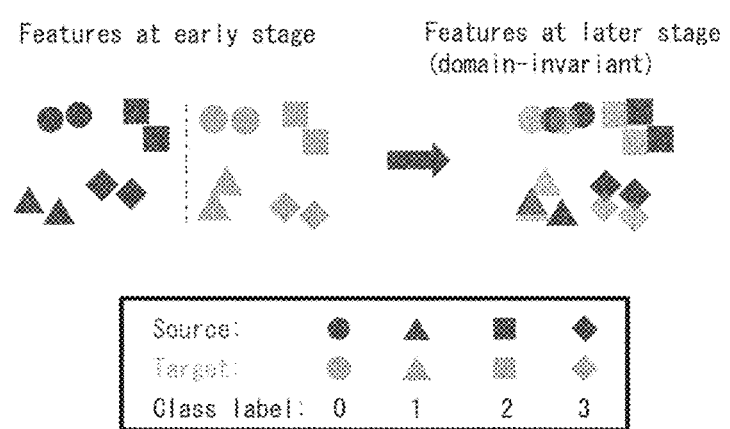
FIG. 12 is a diagram schematically illustrating a domain invariant property in the fourth example embodiment.

FIG. 12 is a diagram schematically illustrating a process in which the first feature extraction section 11a and the second feature extraction section 11b achieve the domain invariant property by the training carried out by the training apparatus 10c. As seen in FIG. 12, features which separately exist in the feature space at an early stage of training do not separately exist in the feature space at a later stage of training. As such, the domain invariant property is achieved by the training which is carried out by the training apparatus 10c.

Advantageous Effect

According to the fourth example embodiment, as explained above, the training apparatus 10c may achieve the domain invariant property of the extracted features $X^S$ and $X^T$. This leads to a preferable target domain property.

Therefore, according to the fourth example embodiment, the training apparatus 10c provides an efficient and stable training process even in a case where a small amount of target domain labeled data is available.

Training Method by Training Apparatus

The following description will discuss a training method carried out by the training apparatus 10c according to the fourth example embodiment with reference to FIG. 13. FIG. 13 is a flowchart showing a flow of a training method S1c carried out by the training apparatus 10c.

As shown in FIG. 13, the training method S1c according to the fourth example embodiment includes a step S15 and a step S16, in addition to the steps included in the training method S1a according to the second example embodiment. In the following descriptions, only differences between the training method S1c according to the fourth example embodiment and the training method S1a according to the second example embodiment will be described.

Step S15

In the step S15, the domain discrimination section 15 carries out a domain discrimination process to discriminate the target domain from the source domain. A specific process carried out by the domain discrimination section 15 is described above and is therefore not repeatedly described here.

Step S16

In the step S16, the domain loss computation section 16 computes and outputs a domain discrimination loss with reference to the result of the discrimination process carried out by the domain discrimination section 15. A specific process carried out by the domain loss computation section 16 is described above and is therefore not repeatedly described here.

Step S144

In the step S144, the merged loss computation section 144 according to the fourth example embodiment computes a merged loss (Loss_merge) with reference to (i) the source domain classification loss (Loss_classification_S), (ii) the target domain classification loss (Loss_classification_T), (iii) the grouping loss (Loss_grouping), and (iv) the domain loss (Loss_domain). A specific process carried out by the merged loss computation section 144 is described above and is therefore not repeatedly described here.

Note that the order of the steps in the training method S1c does not limit the fourth example embodiment. For example, in the training method S1c, each of the step S15 and the step S16 can be carried out before at least any of the step S13a, the step S13b, the step S141, and the step S142.

Advantageous Effect

According to the fourth example embodiment, the training method S1c provides an efficient and stable training process even in a case where a small amount of target domain labeled data is available.

Configuration of Classification Apparatus

The following description will discuss a configuration of a classification apparatus according to the fourth example embodiment. The classification apparatus 20c according to the fourth example embodiment has a configuration similar to that of the classification apparatus 20a illustrated in FIG. 9.

According to the fourth example embodiment, the training apparatus 10c achieves the domain invariant property of the extracted features $X^S$ and $X^T$. This leads to a preferable target domain property.

Therefore, the classification apparatus 20c according to the fourth example embodiment provides a preferable classification process even in a case where a small amount of target domain labeled data is available.

Remarks on Fourth Example Embodiment

To compute the domain loss, class labels are not needed. Thus, instead of using only labeled target domain data, the training apparatus 10c can also use unlabeled (in a sense of class label) target data. As long as the data is from a target dataset, the training apparatus 10c may know that a domain label of the data is TARGET.

By including unlabeled (in a sense of class label) target data, the above mentioned domain-invariant features can be more generalized. The features may be not only domain-invariant relative to all pieces of the labeled data, but also domain-invariant relative to all pieces of unlabeled target data.

The above configuration using unlabeled (in a sense of class label) target data may suitably achieve the domain invariant property in a situation that a limited amount of class labeled target data is available.

Fifth Example Embodiment

The following description will discuss details of a fifth example embodiment of the present invention with reference to the drawings. Note that the same reference numerals are given to elements having the same functions as those described in the foregoing example embodiments, and descriptions of such elements are omitted as appropriate. Moreover, an overview of the fifth example embodiment is the same as the overview of the foregoing example embodiments, and is thus not described here.

Configuration of Training Apparatus

Figure 14:
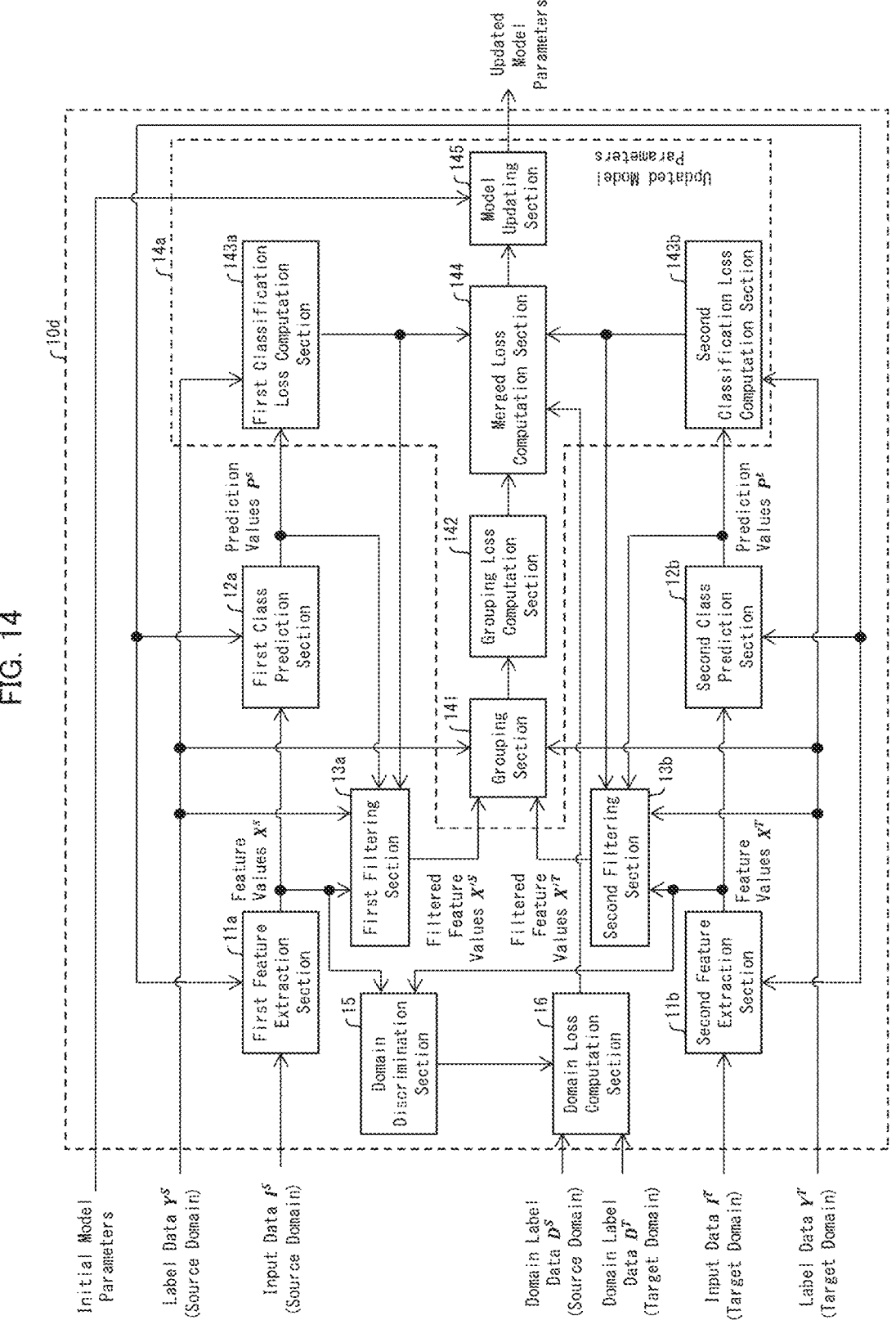
FIG. 14 is a block diagram illustrating a configuration of the training apparatus according to the fifth example embodiment.

The following description will discuss a configuration of a training apparatus 10d according to the fifth example embodiment with reference to FIG. 14. FIG. 14 is a block diagram illustrating a configuration of the training apparatus 10d. As illustrated in FIG. 14, the training apparatus 10d according to the fifth example embodiment is different from the training apparatus 10c according to the fourth example embodiment in that a source domain classification loss (Loss_classification_S) is inputted to the first filtering section 13a, and a target domain classification loss (Loss_classification_T) is inputted to the second filtering section 13b.

In other words, the training apparatus 10d according to the fifth example embodiment includes both the configuration described in the third example embodiment and the configuration described in the fourth example embodiment.

Therefore, the training apparatus 10d according to the fifth example embodiment brings about both the effect achieved by the configuration of the third example embodiment and the effect achieved by the configuration of the fourth example embodiment.

Configuration of Classification Apparatus

The classification apparatus 20d according to the fifth example embodiment has a configuration similar to that of the classification apparatus 20a illustrated in FIG. 9. The training apparatus 10d according to the fifth example embodiment includes both the configuration described in the third example embodiment and the configuration described in the fourth example embodiment. Furthermore, the classification apparatus 20d according to the fifth example embodiment includes the feature extraction section 11b and the class prediction section 12b which have been trained by the training apparatus 10d.

Therefore, the classification apparatus 20d according to the fifth example embodiment brings about both the effect achieved by the classification apparatus 20b according to the third example embodiment and the effect achieved by the classification apparatus 20c according to the fourth example embodiment.

Example of Configuration Achieved by Software

One or some of or all of the functions of the training apparatuses 10, 10a, 10b, 10c, and 10d and the classification apparatuses 20, 20a, 20b, 20c, and 20d can be realized by hardware such as an integrated circuit (IC chip) or can be alternatively realized by software.

Figure 15:
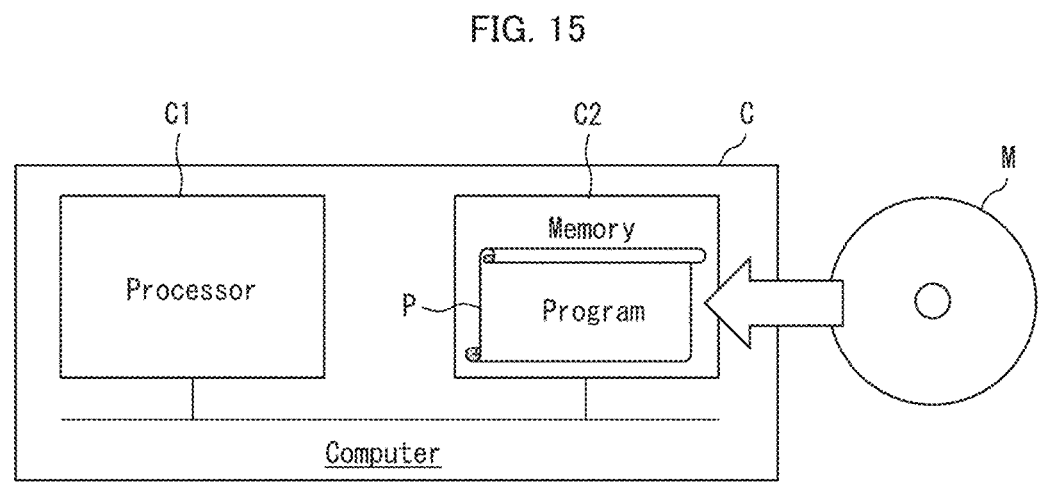

In the latter case, each of the training apparatuses 10, 10a, 10b, 10c, and 10d and the classification apparatuses 20, 20a, 20b, 20c, and 20d is realized by, for example, a computer that executes instructions of a program that is software realizing the foregoing functions. FIG. 15 illustrates an example of such a computer (hereinafter, referred to as "computer C"). The computer C includes at least one processor C1 and at least one memory C2. The memory C2 stores a program P for causing the computer C to function as any of the training apparatuses 10, 10a, 10b, 10c, and 10d and the classification apparatuses 20, 20a, 20b, 20c, and 20d. In the computer C, the processor C1 reads the program P from the memory C2 and executes the program P, so that the functions of any of the training apparatuses 10, 10a, 10b, 10c, and 10d and the classification apparatuses 20, 20a, 20b, 20c, and 20d are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other devices. The computer C can further include an input-output interface for connecting input-output devices such as a keyboard, a mouse, a display, and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by properly combining technical means disclosed in the foregoing example embodiments.

Additional Remark 2

The whole or part of the example embodiments disclosed above can be described as follows. Note, however, that the present invention is not limited to the following example aspects.

SUPPLEMENTARY NOTES

Aspects of the present invention can also be expressed as follows:

Aspect 1

A training apparatus comprising:

one or more feature extraction means for extracting source domain feature values from source domain data and for extracting target domain feature values from target domain data;

one or more class prediction means for predicting source domain class prediction values from the source domain feature values and for predicting target domain class prediction values from the target domain feature values;

one or more filtering means for computing filtered source domain feature values and filtered target domain feature values by filtering out one or more values from the source domain feature values with reference to the source domain class prediction values and by filtering out one or more values from the target domain feature values with reference to the target domain class prediction values; and updating means for updating at least one of the one or more feature extraction means and one or more class prediction means with reference to a source domain classification loss computed with reference to the source domain class prediction values, a target domain classification loss computed with reference to the target domain class prediction values, and a grouping loss computed with reference to the filtered source domain feature values and the filtered target domain feature values.

According to the above configuration, it is possible to provide an efficient and stable training process even in a case where a small amount of target domain labeled data is available Aspect 2

The training apparatus according to Aspect 1, wherein the one or more filtering means filter out one or more values from the source domain feature values with reference to the source domain class prediction values and to source domain class label data, and filter out one or more values from the target domain feature values with reference to the target domain class prediction values and to target domain class label data.

According to the above configuration, it is possible to provide a more efficient and stable training process.

Aspect 3

The training apparatus according to Aspect 1 or 2, wherein the one or more filtering means further refer to the source domain classification loss and the target domain classification loss.

According to the above configuration, it is possible to provide a more efficient and stable training process.

Aspect 4

The training apparatus according to any one of Aspects 1 to 3, wherein the updating means comprises grouping means for outputting, from the filtered source domain feature values and the filtered target domain feature values, class groups, where each of the class groups contains feature values sharing a same class label.

According to the above configuration, it is possible to provide a more efficient and stable training process.

Aspect 5

The training apparatus according to Aspect 4, wherein the updating means further comprises grouping loss computation means for computing the grouping loss with reference to the class groups.

According to the above configuration, it is possible to provide a more efficient and stable training process.

Aspect 6

The training apparatus according to Aspect 5, wherein the grouping loss computation means computes the grouping loss based on intra class metrics determined with reference to the feature values in a same class, and inter class metrics determined with reference to the feature values in different classes.

According to the above configuration, it is possible to provide a more efficient and stable training process.

Aspect 7

The training apparatus according to any one of Aspects 1 to 6, wherein the updating means further comprises one or more classification loss computation means for computing the source domain classification loss with reference to the source domain class prediction values and to the source domain class label data, and the target domain classification loss with reference to the target domain class prediction values and to the target domain class label data.

According to the above configuration, it is possible to provide a more efficient and stable training process.

Aspect 8

The training apparatus according to any one of Aspects 1 to 7, wherein the updating means further comprises merged loss computation means for computing a merged loss with reference to (i) the source domain classification loss, (ii) the target domain classification loss and (iii) the grouping loss, wherein the updating means updates at least one of the one or more feature extraction means and the one or more class prediction means with reference to the merged loss.

According to the above configuration, it is possible to provide a more efficient and stable training process.

Aspect 9

The training apparatus according to any one of claims 1 to 8, further comprising:

one or more domain discrimination means for carrying out a discrimination process to discriminate the target domain from the source domain; and one or more domain loss computation means for outputting a domain discrimination loss as a result of the discrimination process, wherein the updating means further refers to the domain discrimination loss, and the updating means further updates the domain discrimination means.

According to the above configuration, it is possible to provide a more efficient and stable training process.

Aspect 10

A classification apparatus comprising:

feature extraction means for extracting target domain feature values from target domain data; and class prediction means for predicting target domain class prediction values from the target domain feature values, wherein at least one of the feature extraction means and the class prediction means has been trained with reference to filtered source domain feature values obtained by filtering out one or more values from source domain feature values, and filtered target domain feature values obtained by filtering out one or more values from target domain feature values.

According to the above configuration, it is possible to provide a preferable classification process even in a case where a small amount of target domain labeled data is available.

Aspect 11

A training method comprising:

extracting, by one or more feature extraction means, source domain feature values from source domain data and target domain feature values from target domain data;

predicting, by one or more class prediction means, source domain class prediction values from the source domain feature values and target domain class prediction values from the target domain feature values;

computing filtered source domain feature values and filtered target domain feature values by filtering out one or more values from the source domain feature values with reference to the source domain class prediction values and by filtering out one or more values from the target domain feature values with reference to the target domain class prediction values; and updating at least one of the one or more feature extraction means and the one or more class prediction means with reference to a source domain classification loss computed with reference to the source domain class prediction values, a target domain classification loss computed with reference to the target domain class prediction values, and a grouping loss computed with reference to the filtered source domain feature values and the filtered target domain feature values.

According to the above method, it is possible to provide an efficient and stable training process even in a case where a small amount of target domain labeled data is available.

Aspect 12

A classification method comprising:

extracting, by feature extraction means, target domain feature values from target domain data, and predicting, by class prediction means, target domain class prediction values from the target domain feature values, wherein at least one of the feature extraction means and the class prediction means has been trained with reference to filtered source domain feature values obtained by filtering out one or more values from source domain feature values, and filtered target domain feature values obtained by filtering out one or more values from target domain feature values.

According to the above method, it is possible to provide a preferable classification process even in a case where a small amount of target domain labeled data is available.

Aspect 13

A program for causing a computer to serve as the training apparatus according to Aspect 1, said program causing the computer to serve as the one or more feature extraction means, the one or more class prediction means, the one or more filtering means, and the updating means.

Aspect 14

A program for causing a computer to serve as the classification apparatus according to Aspect 10, said program causing the computer to serve as the feature extraction means and the class prediction means.

Aspect 15

A training apparatus comprising at least one processor, the processor extracting, by one or more feature extractors, source domain feature values from source domain data and target domain feature values from target domain data, predicting, by one or more class predictors, source domain class prediction values from the source domain feature values and target domain class prediction values from the target domain feature values, computing filtered source domain feature values and filtered target domain feature values by filtering out one or more values from the source domain feature values with reference to the source domain class prediction values and by filtering out one or more values from the target domain feature values with reference to the target domain class prediction values, and updating at least one of the one or more feature extractors and the one or more class predictors with reference to a source domain classification loss computed with reference to the source domain class prediction values, a target domain classification loss computed with reference to the target domain class prediction values, and a grouping loss computed with reference to the filtered source domain feature values and the filtered target domain feature values.

Note that the training apparatus can further include a memory. In the memory, a program for causing the processor to execute the processes can be stored. Alternatively, the program can be stored in a computer-readable non-transitory tangible storage medium.

Aspect 16

A classification apparatus comprising at least one processor, the processor extracting, by a feature extractor, target domain feature values from target domain data, and predicting, by a class predictor, target domain class prediction values from the target domain feature values, wherein at least one of the feature extractor and the class predictor has been trained with reference to filtered source domain feature values obtained by filtering out one or more values from source domain feature values, and filtered target domain feature values obtained by filtering out one or more values from target domain feature values.

Note that the classification apparatus can further include a memory. In the memory, a program for causing the processor to execute the processes can be stored. Alternatively, the program can be stored in a computer-readable non-transitory tangible storage medium.

REFERENCE SIGNS LIST

10, 10a, 10b, 10c, 10d Training Apparatus
20, 20a, 20b, 20c, 20d Classification Apparatus
11, 11a, 11b Feature Extraction Section
12, 12a, 12b Class Prediction Section
13, 13a, 13b Filtering Section
14, 14a Updating Section
141 Grouping Section
142 Grouping Loss Computation Section
143a, 143b Classification Loss Computation Section
144 Merged Loss Computation Section
145 Model Updating Section
15 Domain Discrimination Section
16 Domain Loss Computation Section

What is claimed is:

1. A training apparatus comprising at least one processor, the processor carrying out extraction process for extracting, by one or more feature extractors, source domain feature values from source domain data and for extracting target domain feature values from target domain data;

predicting process for predicting, by one or more class predictors, source domain class prediction values from the source domain feature values and for predicting target domain class prediction values from the target domain feature values;

filtering process for computing filtered source domain feature values and filtered target domain feature values by filtering out one or more values from the source domain feature values with reference to the source domain class prediction values and by filtering out one or more values from the target domain feature values with reference to the target domain class prediction values; and updating process for updating at least one of the one or more feature extractors and one or more class predictors with reference to a source domain classification loss computed with reference to the source domain class prediction values, a target domain classification loss computed with reference to the target domain class prediction values, and a grouping loss computed with reference to the filtered source domain feature values and the filtered target domain feature values.

2. The training apparatus according to claim 1, wherein the filtering process includes filtering out one or more values from the source domain feature values with reference to the source domain class prediction values and to source domain class label data, and filtering out one or more values from the target domain feature values with reference to the target domain class prediction values and to target domain class label data.

3. The training apparatus according to claim 1, wherein the filtering process further refer to the source domain classification loss and the target domain classification loss.

4. The training apparatus according to claim 1, wherein the updating process comprises grouping process for outputting, from the filtered source domain feature values and the filtered target domain feature values, class groups, where each of the class groups contains feature values sharing a same class label.

5. The training apparatus according to claim 4, wherein the updating process further comprises grouping loss computation process for computing the grouping loss with reference to the class groups.

6. The training apparatus according to claim 5, wherein the grouping loss computation process computes the grouping loss based on intra class metrics determined with reference to the feature values in a same class, and inter class metrics determined with reference to the feature values in different classes.

7. The training apparatus according to claim 1, wherein the updating process further comprises one or more classification loss computation process for computing the source domain classification loss with reference to the source domain class prediction values and to source domain class label data, and the target domain classification loss with reference to the target domain class prediction values and to target domain class label data.

8. The training apparatus according to claim 1, wherein the updating process further comprises merged loss computation means process for computing a merged loss with reference to (i) the source domain classification loss, (ii) the target domain classification loss and (iii) the grouping loss, wherein the updating process updates at least one of the one or more feature extractors and the one or more class predictors with reference to the merged loss.

9. The training apparatus according to claim 1, the processor further carrying out:

one or more domain discrimination process, by a domain discriminator, to discriminate the target domain from the source domain; and one or more domain loss computation process for outputting a domain discrimination loss as a result of the discrimination process, wherein the updating process further refers to the domain discrimination loss, and the updating process further updates the domain discriminator.

10. A classification apparatus comprising at least one processor, the processor carrying out:

extraction process for extracting, by a feature extractor, target domain feature values from target domain data; and prediction process for predicting, by a class predictor, target domain class prediction values from the target domain feature values, wherein at least one of the feature extractor and the class predictor has been trained with reference to filtered source domain feature values obtained by filtering out one or more values from source domain feature values, and filtered target domain feature values obtained by filtering out one or more values from target domain feature values.

11. A training method comprising:

extracting, by one or more feature extractors, source domain feature values from source domain data and target domain feature values from target domain data;

predicting, by one or more class predictors, source domain class prediction values from the source domain feature values and target domain class prediction values from the target domain feature values;

computing filtered source domain feature values and filtered target domain feature values by filtering out one or more values from the source domain feature values with reference to the source domain class prediction values and by filtering out one or more values from the target domain feature values with reference to the target domain class prediction values; and updating at least one of the one or more feature extractors and the one or more class predictors with reference to a source domain classification loss computed with reference to the source domain class prediction values, a target domain classification loss computed with reference to the target domain class prediction values, and a grouping loss computed with reference to the filtered source domain feature values and the filtered target domain feature values.

12. A non-transitory storage medium storing therein a program for causing a computer to serve as the training apparatus according to claim 1, said program causing the computer to carrying out the extraction process, the prediction process, the filtering process, and the updating process.

13. A non-transitory storage medium storing therein a program for causing a computer to serve as the classification apparatus according to claim 10, said program causing the computer to carry out the extraction process and the prediction process.

\* \* \* \* \*